United States Patent
Jensen et al.

(10) Patent No.: US 7,470,758 B2
(45) Date of Patent: Dec. 30, 2008

(54) POLYMERIZATION CATALYSTS FOR PRODUCING POLYMERS WITH LOW LEVELS OF LONG CHAIN BRANCHING

(75) Inventors: Michael D. Jensen, Bartlesville, OK (US); Joel L. Martin, Bartlesville, OK (US); Max P. McDaniel, Bartlesville, OK (US); David C. Rolfing, Bartlesville, OK (US); Qing Yang, Bartlesville, OK (US); Matthew G. Thorn, Bartlesville, OK (US); Ashish M. Sukhadia, Bartlesville, OK (US); Youlu Yu, Bartlesville, OK (US); Jerry T. Lanier, Bartlesville, OK (US)

(73) Assignee: Chevron Phillips Chemical Company, LP, The Woodlands, TX (US)

( * ) Notice: Subject to any disclaimer, the term of this patent is extended or adjusted under 35 U.S.C. 154(b) by 54 days.

(21) Appl. No.: 11/607,232

(22) Filed: Dec. 1, 2006

(65) Prior Publication Data

US 2007/0287814 A1  Dec. 13, 2007

Related U.S. Application Data

(62) Division of application No. 10/876,930, filed on Jun. 25, 2004, now Pat. No. 7,148,298.

(51) Int. Cl.
*C08F 4/52* (2006.01)
*C08F 4/64* (2006.01)
*C08F 4/65* (2006.01)
*C08F 2/00* (2006.01)

(52) U.S. Cl. .......... 526/160; 526/170; 526/75; 526/127; 526/129; 526/130; 502/103; 502/118; 502/117; 502/104

(58) Field of Classification Search ........ 502/113; 526/160, 170, 75

See application file for complete search history.

(56) References Cited

U.S. PATENT DOCUMENTS

| 5,071,808 | A | * | 12/1991 | Antberg et al. ......... 502/107 |
| 5,498,581 | A |   | 3/1996  | Welch et al. |
| 5,565,592 | A |   | 10/1996 | Patsidis et al. |
| 5,576,259 | A |   | 11/1996 | Hasegawa et al. |
| 5,714,425 | A |   | 2/1998  | Chabrand et al. |
| 5,767,300 | A | * | 6/1998  | Aulbach et al. ......... 556/7 |
| 5,906,955 | A |   | 5/1999  | Hamura et al. |

(Continued)

FOREIGN PATENT DOCUMENTS

EP    0685495 A1    12/1995

(Continued)

OTHER PUBLICATIONS

Alt et al. J. Organomet. Chem., 1998, 562, 229-253.*

(Continued)

*Primary Examiner*—Vasu Jagannathan
*Assistant Examiner*—Rip A. Lee
(74) *Attorney, Agent, or Firm*—Merchant & Gould, P.C.

(57) ABSTRACT

This invention relates to catalyst compositions, methods, and polymers encompassing a Group 4 metallocene with bridging $\eta^5$-cyclopentadienyl-type ligands, in combination with a cocatalyst and an activator-support. The compositions and methods disclosed herein provide ethylene polymers with low levels of long chain branching.

18 Claims, 3 Drawing Sheets

A       B       C

U.S. PATENT DOCUMENTS

| | | | |
|---|---|---|---|
| 5,942,459 | A | 8/1999 | Sugano et al. |
| 6,034,187 | A | 3/2000 | Maehama et al. |
| 6,107,230 | A | 8/2000 | McDaniel et al. |
| 6,165,929 | A | 12/2000 | McDaniel et al. |
| 6,174,981 | B1 | 1/2001 | Bergmeister et al. |
| 6,201,077 | B1 | 3/2001 | Bergmeister et al. |
| 6,204,346 | B1 | 3/2001 | Bergmeister et al. |
| 6,294,494 | B1 | 9/2001 | McDaniel et al. |
| 6,300,271 | B1 | 10/2001 | McDaniel et al. |
| 6,316,553 | B1 | 11/2001 | McDaniel et al. |
| 6,340,652 | B1 | 1/2002 | Sugano et al. |
| 6,355,594 | B1 | 3/2002 | McDaniel et al. |
| 6,376,415 | B1 | 4/2002 | McDaniel et al. |
| 6,391,816 | B1 | 5/2002 | McDaniel et al. |
| 6,395,666 | B1 | 5/2002 | McDaniel et al. |
| 6,509,427 | B1 | 1/2003 | Welch et al. |
| 6,524,987 | B1 | 2/2003 | Collins et al. |
| 6,548,441 | B1 | 4/2003 | McDaniel et al. |
| 7,041,617 | B2 * | 5/2006 | Jensen et al. ............. 502/113 |
| 7,064,225 | B2 | 6/2006 | Thorn et al. |
| 7,094,857 | B2 * | 8/2006 | Sukhadia et al. ........... 526/352 |
| 7,119,153 | B2 * | 10/2006 | Jensen et al. ............. 526/113 |
| 2002/0169072 | A1 | 11/2002 | Nakayama et al. |
| 2003/0191013 | A1 | 10/2003 | Antonio et al. |
| 2005/0288178 | A1 | 12/2005 | Jensen et al. |
| 2005/0288461 | A1 | 12/2005 | Jensen et al. |
| 2005/0288524 | A1 | 12/2005 | Thorn et al. |

FOREIGN PATENT DOCUMENTS

| | | |
|---|---|---|
| EP | 0810234 A1 | 12/1997 |
| EP | 1325899 | 7/2003 |
| WO | WO 99/60033 | 11/1999 |
| WO | WO 01/23433 | 4/2001 |
| WO | WO 01/23434 | 4/2001 |
| WO | WO 01/41920 | 6/2001 |
| WO | WO 01/44309 | 6/2001 |
| WO | WO 01/58587 | 8/2001 |
| WO | WO 01/83498 | 11/2001 |
| WO | WO 01/90239 | 11/2001 |

OTHER PUBLICATIONS

U.S. Appl. No. 10/994,828; Office Action dated Jun. 14, 2007.
U.S. Appl. No. 10/994,828; Office Action dated Nov. 29, 2007.
Shida, M. et al., "Correlation Of Low Density Polyethylene Rhological Measurements . . . ", Polymer Engineering and Science, vol. 17, No. 11, pp. 769-774 (Nov. 19, 1977).
Arnett, R.L. et al., "Zero-Shear Viscosity Of Some Ethyl Branched Paraffinic Model Polymers", Journal of Physical Chemistry, vol. 84, No. 6, pp. 649-652 (Mar. 31, 1980).
Alt, H.G. et al., "Syndiospezifische Polymerisation von Propylen . . . , Journal of Organometallic Chemistry", vol. 522, pp. 39-54 (1996).
Kajigaeshi, S. et al., "Selective Preparation Of Fluorene Derivatives Using the t-Butyl Function As A Positional . . . ", The Chem. Society of Japan, vol. 59, p. 97 (1986).
Alt, H.G. et al., Journal of Organometallic Chemistry vol. 562, pp. 153-181.
Kolodka, E. et al., "Long Chain Branching In Slurry Polymerization Of Ethylene With Zirconocene Dichloride/Modified Methy . . . ", Polymer, vol. 41, No. 11, pp. 3985-3991 (2000).
Villar, M.A. et al., Polymer, vol. 42, pp. 9269-9179 (2001).
Koppl, A. et al., "Heterogeneous Metallocene Catalysts for Ethlene Polymerization", Journal of Molecular Catalysis A: Chemical, vol. 165, pp. 23-32 (2001).
Walter, P. et al., "Influence Of Zirconocene Structure And Propene Content On Melt Rheology of Polyethene and Ethene/Propene . . . ", Polymer Bulletin, vol. 46, pp. 205-213 (2001).
Sukhadia, A.M., "The Complex Effects Of Long Chain Branching On The Blown Film Performance Of LLDPE Resins", Antec Annual Conference (May 5-9, 2002- California).
Malmberg, A. et al., "Long-Chain Branching in Metallocene-Catalyzed Polyethylenes Investigated By Low Oscillatory Shear . . . ", Macromolecules, vol. 35, pp. 1038-1048 (2002).
Podzimek, S., "A Review Of The Analysis Of Branched Polymers By SEC-MALS", American Laboratory, (Jan. 2002), pp. 38-45.
Alt, H.G. et al., Journal Of Organometallic Chemistry, vol. 568, pp. 87-112 (1998).
Das, P.K., "Computational Chemistry of Metallocene Catalyzed Olefin Polymerization", 21$^{st}$ Century Symp. S.W. Regional American Chemical Society Meeting (Oct. 25-28, 2003—OK).
Kokko, E., Influence Of The Catalyst and Polymerization Conditions On The Long-Chain Branching Of Metallocene . . . , Journal of Polymer Science, vol. 38, pp. 376-388 (2000).
International Search Report and Written Opinion, PCT/US05/022849, Apr. 27, 2006, 9 pages.
International Search Report and Written Opinion, PCT/US05/022998, Apr. 27, 2006, 9 pages.

* cited by examiner

POLYMERIZATION CATALYSTS FOR PRODUCING POLYMERS WITH LOW LEVELS OF LONG CHAIN BRANCHING

REFERENCE TO RELATED APPLICATIONS

This application is a divisional application of U.S. patent application Ser. No. 10/876,930, filed on Jun. 25, 2004, now U.S. Pat. No. 7,148,298, which is incorporated herein by reference in its entirety.

TECHNICAL FIELD OF THE INVENTION

This invention relates to the field of organometal compositions, olefin polymerization catalyst compositions, methods for the polymerization and copolymerization of olefins using a catalyst composition, and polyolefins.

BACKGROUND OF THE INVENTION

It is known that mono-1-olefins ($\alpha$-olefins), including ethylene, can be polymerized with catalyst compositions employing titanium, zirconium, vanadium, chromium, or other metals, often combined with a solid oxide and in the presence of cocatalysts. These catalyst compositions may be useful for both homopolymerization of ethylene, as well as copolymerization of ethylene with comonomers such as propylene, 1-butene, 1-hexene, or other higher $\alpha$-olefins. Therefore, there exists a constant search to develop new olefin polymerization catalysts, catalyst activation processes, and methods of making and using catalysts that will provide enhanced catalytic activities and polymeric materials tailored to specific end uses.

Polyethylene (PE) produced by any number of methods generally contains small to moderate amounts of long chain branched molecules. In some instances, long chain branching (LCB) is desired to improve bubble stability during film blowing or to enhance the processibility of resins prepared with metallocene catalysts. However for many uses, the presence of LCB is considered undesirable due to the increased elasticity that it typically imparts to the resins. Therefore the ability to control the LCB level in polyethylene using metallocene-based catalysts is a desirable goal.

One example of this need is seen in the use of bridged or ansa-metallocene catalysts, which are desirable catalysts for some purposes, but which may tend to produce polymer with LCB levels that are detrimental to film performance. Therefore, new catalyst compositions and methods that allow better control of LCB levels within a desired specification range is a desirable goal.

SUMMARY OF THE INVENTION

This invention encompasses catalyst compositions, methods for preparing catalyst compositions, methods for polymerizing olefins, and ethylene polymers and copolymers. In the course of examining metallocene-based olefin polymerization catalysts, it was discovered that the LCB content of PE resins made with such catalysts was related to the type of metallocene catalyst employed, and also related to the particular solid oxide activator, or "activator-support" which constitutes one component of the catalyst composition.

In one aspect, the present invention encompasses a catalyst composition comprising a tightly-bridged ansa-metallocene compound containing a pendant unsaturated moiety attached to a cyclopentadienyl-type ligand, a solid oxide activator-support, and an organoaluminum compound. The pendant unsaturated moiety attached to a cyclopentadienyl-type ligand of the ansa-metallocene compound may be a pendant olefin, that can be bonded to the cyclopentadienyl-type ligand through a silicon, carbon, or other atoms. In another aspect, this invention comprises the contact product of a tightly-bridged ansa-metallocene compound containing a pendant unsaturated moiety attached to a cyclopentadienyl-type ligand, a solid oxide activator-support, and an organoaluminum compound.

In one aspect, the catalyst composition of this invention can comprise the contact product of at least one ansa-metallocene, at least one organoaluminum compound, and at least one activator-support, wherein:

a) the ansa-metallocene comprises a compound having the formula:

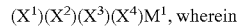
$(X^1)(X^2)(X^3)(X^4)M^1$, wherein $M^1$ is titanium, zirconium, or hafnium;
$(X^1)$ and $(X^2)$ are independently selected from a cyclopentadienyl, an indenyl, a fluorenyl, or a substituted analog thereof, wherein at least one of $(X^1)$ and $(X^2)$ is substituted;
at least one substituent of the substituted $(X^1)$ or $(X^2)$ comprises an unsaturated group having the formula

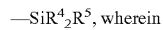
—$SiR^4{}_2R^5$, wherein each $R^4$ is independently selected from a hydrocarbyl group or a substituted hydrocarbyl group having from 1 to about 20 carbon atoms;
$R^5$ is an alkenyl group, an alkynyl group, an alkadienyl group, or a substituted analog thereof having from 1 to about 20 carbon atoms;
$(X^1)$ and $(X^2)$ are connected by a substituted or unsubstituted bridging group comprising one atom bonded to both $(X^1)$ and $(X^2)$, wherein the atom is carbon, silicon, germanium, or tin; and
any substituent on $R^4$, any substituent on $R^5$, any substituent on the substituted bridging group, any additional substituent on $(X^1)$ or $(X^2)$, and $(X^3)$ and $(X^4)$ are independently selected from an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any of which having from 1 to about 20 carbon atoms; a halide; or hydrogen;

b) the organoaluminum compound comprises a compound with the formula:

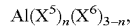
$Al(X^5)_n(X^6)_{3-n}$, wherein $(X^5)$ is a hydrocarbyl having from 1 to about 20 carbon atoms; $(X^6)$ is an alkoxide or an aryloxide having from 1 to about 20 carbon atoms, halide, or hydride; and n is a number from 1 to 3, inclusive; and c) the activator-support comprises:
a solid oxide treated with an electron-withdrawing anion;
a layered mineral,
an ion-exchangeable activator-support, or
any combination thereof.

In this aspect, the catalyst composition of this invention can comprise at least one ansa-metallocene, at least one organoaluminum compound, and at least one activator-support.

In a further aspect of this invention, the activator-support can comprise a solid oxide treated with an electron-withdrawing anion, wherein the solid oxide comprises silica, alumina, silica-alumina, aluminophosphate, aluminum phosphate, zinc aluminate, heteropolytungstates, titania, zirconia, magnesia, boria, zinc oxide, mixed oxides thereof, or mixtures thereof. In this aspect, the electron-withdrawing anion can comprise fluoride, chloride, bromide, iodide, phosphate, triflate, bisulfate, sulfate, fluoroborate, fluorosulfate, trifluoroacetate, phosphate, fluorophosphate, fluorozirconate, fluorosilicate, fluorotitanate, permanganate, substituted sulfonate, unsubstituted sulfonate, or any combination thereof. In addition, the activator-support can further comprises a metal or metal ion such as zinc, nickel, vanadium, tungsten, molybdenum, silver, tin, or any combination thereof.

In a further aspect of this invention, the activator-support can comprise a layered mineral, an ion-exchangeable activator-support, or any combination thereof. In this aspect, the activator-support can comprise a clay mineral, a pillared clay, an exfoliated clay, an exfoliated clay gelled into another oxide matrix, a layered silicate mineral, a non-layered silicate mineral, a layered aluminosilicate mineral, a non-layered aluminosilicate mineral, or any combination thereof.

In another aspect, this invention further provides a process for producing a polymerization catalyst composition comprising contacting at least one ansa-metallocene compound, at least one organoaluminum compound, and at least one treated solid oxide compound to produce the composition, wherein the at least one ansa-metallocene, the at least one organoaluminum compound, and the at least one activator-support are defined herein.

In still another aspect, this invention affords a method of polymerizing olefins, comprising: contacting ethylene and an optional α-olefin comonomer with a catalyst composition under polymerization conditions to form a polymer or copolymer; wherein the catalyst composition comprises the contact product of at least one ansa-metallocene, at least one organoaluminum compound, and at least one activator-support, and wherein the at least one ansa-metallocene, the at least one organoaluminum compound, and the at least one activator-support are defined herein.

In a further aspect, the present invention provides ethylene polymers and copolymers, and articles made therefrom, produced by contacting ethylene and an optional α-olefin comonomer with a catalyst composition under polymerization conditions to form a polymer or copolymer; wherein the catalyst composition comprises the contact product of at least one ansa-metallocene, at least one organoaluminum compound, and at least one activator-support, and wherein the at least one ansa-metallocene, the at least one organoaluminum compound, and the at least one activator-support are defined as herein.

In another aspect of this invention, the ansa-metallocene of the catalyst composition can be a compound with the following formula:

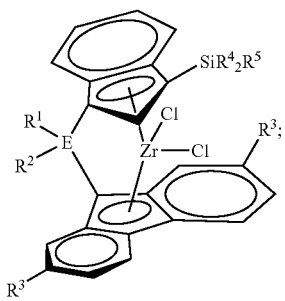

wherein E is carbon, silicon, germanium, or tin; $R^1$, $R^2$, $R^3$, and $R^4$ are independently selected from H or a hydrocarbyl group having from 1 to about 12 carbon atoms; and $R^5$ is an alkenyl group having from about 3 to about 12 carbon atoms.

In a further aspect of this invention, the ansa-metallocene of the catalyst composition can be a compound with the following formula:

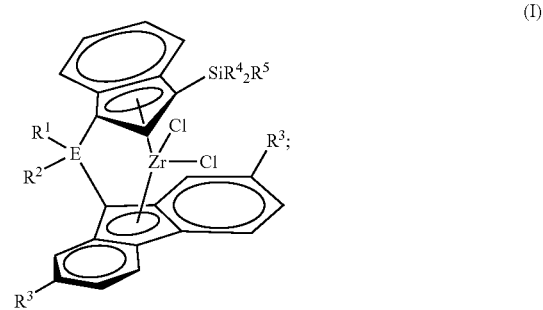

wherein E is carbon or silicon; $R^1$, $R^2$, and $R^4$ are independently selected from methyl or phenyl; $R^3$ is H or t-butyl; and $R^5$ is 2-propenyl ($CH_2CH=CH_2$), 3-butenyl ($CH_2CH_2CH=CH_2$), 4-pentenyl ($CH_2CH_2CH_2CH=CH_2$), 5-hexenyl ($CH_2CH_2CH_2CH_2CH=CH_2$), 6-heptenyl ($CH_2CH_2CH_2CH_2CH_2CH=CH_2$), 7-octenyl ($CH_2CH_2CH_2CH_2CH_2CH_2CH=CH_2$), 3-methyl-3-butenyl ($CH_2CH_2C(CH_3)=CH_2$), or 4-methyl-3-pentenyl ($CH_2CH_2CH=C(CH_3)_2$).

In another aspect of this invention, the ansa-metallocene of the catalyst composition can be a compound with the following formula:

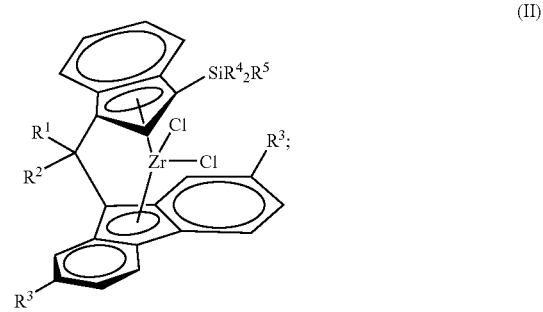

wherein $R^1$ and $R^2$ are independently selected from methyl or phenyl; $R^3$ is H or t-butyl; each $R^4$ is independently selected from methyl, ethyl, propyl, or butyl; and $R^5$ is 2-propenyl ($CH_2CH=CH_2$), 3-butenyl ($CH_2CH_2CH=CH_2$), or 4-pentenyl ($CH_2CH_2CH_2CH=CH_2$).

In yet another aspect of this invention, the ansa-metallocene of the catalyst composition can be a compound with the following formula:

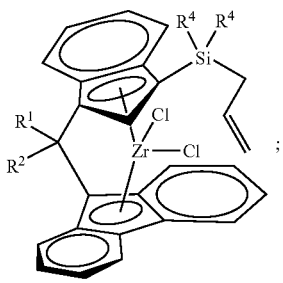

(III)

wherein $R^1$ and $R^2$ are independently selected from methyl or phenyl; and each $R^4$ is independently selected from methyl, ethyl, propyl, or butyl.

In another aspect of this invention, the activator-support can comprise:
  a solid oxide treated with an electron-withdrawing anion (also termed a chemically-treated solid oxide);
  a layered mineral;
  an ion-exchangeable activator-support; or
  any combination thereof.

In this aspect, the chemically-treated solid oxide comprising a solid oxide treated with an electron-withdrawing anion; wherein:
  the solid oxide can be silica, alumina, silica-alumina, aluminophosphate, aluminum phosphate, zinc aluminate, heteropolytungstates, titania, zirconia, magnesia, boria, zinc oxide, mixed oxides thereof, or mixtures thereof; and
  the electron-withdrawing anion can be fluoride, chloride, bromide, iodide, phosphate, triflate, bisulfate, sulfate, fluoroborate, fluorosulfate, trifluoroacetate, phosphate, fluorophosphate, fluorozirconate, fluorosilicate, fluorotitanate, permanganate, substituted sulfonate, unsubstituted sulfonate, or any combination thereof. Also in this aspect, the activator-support can comprise a clay mineral, a pillared clay, an exfoliated clay, an exfoliated clay gelled into another oxide matrix, a layered silicate mineral, a non-layered silicate mineral, a layered aluminosilicate mineral, a non-layered aluminosilicate mineral, or any combination thereof. In a further aspect, the activator-support can further comprise a metal or metal ion such as zinc, nickel, vanadium, tungsten, molybdenum, silver, tin, or any combination thereof.

Examples of the solid oxide activator-support include, but are not limited to, chlorided alumina, chlorided zinc aluminate, fluorided alumina, sulfated alumina, fluorided silica-alumina, fluorided aluminophosphate, a pillared clay, or a combination thereof. In another aspect, for examples, the activator-support can be a sulfated solid oxide, and in another aspect, sulfated alumina.

In another aspect of the invention, the organoaluminum compound comprises a compound of the formula $Al(X^5)_n(X^6)_{3-n}$, wherein $(X^5)$ is a hydrocarbyl having from 1 to about 20 carbon atoms; $(X^6)$ is alkoxide or aryloxide, any of which having from 1 to about 20 carbon atoms, halide, or hydride; and n is a number from 1 to 3, inclusive. In another aspect, the organoaluminum compound may be trimethylaluminum, triethylaluminum, tripropylaluminum, tributylaluminum, triisobutylaluminum, trihexylaluminum, triisohexylaluminum, trioctylaluminum, diethylaluminum ethoxide, diisobutylaluminum hydride, diethylaluminum chloride, or any combination thereof. Examples of the organoaluminum compound include, but are not limited to, triethylaluminum (TEA) or triisobutylaluminum (TIBAL).

In one aspect of this invention, the activity of the catalyst compositions of this invention may be enhanced by precontacting some of the polymerization reaction components to form a first mixture, for a first period of time, before this mixture is then contacted with the remaining polymerization reaction components, forming a second mixture, for a second period of time. For example, the ansa-metallocene compound can be precontacted with some other polymerization reaction components, including, but not limited to, for example, an α-olefin monomer and an organoaluminum cocatalyst, for some period of time before this mixture is contacted with the remaining polymerization reaction components, including, but not limited to, a solid oxide activator-support. The first mixture is typically termed the "precontacted" mixture and comprises precontacted components, and the second mixture is typically termed the "postcontacted" mixture and comprises postcontacted components. For example, the mixture of at least one metallocene, olefin monomer, and organoaluminum cocatalyst compound, before it is contacted with the activator-support, is one type of "precontacted" mixture. The mixture of metallocene, monomer, organoaluminum cocatalyst, and acidic activator-support, formed from contacting the precontacted mixture with the acidic activator-support, is thus termed the "postcontacted" mixture. This terminology is used regardless of what type of reaction occurs between components of the mixtures. For example, according to this description, it is possible for the precontacted organoaluminum compound, once it is admixed with the metallocene or metallocenes and the olefin monomer, to have a different chemical formulation and structure from the distinct organoaluminum compound used to prepare the precontacted mixture.

This invention also comprises methods of making catalyst compositions that utilize at least one ansa-metallocene catalyst, at least one organoaluminum compound as cocatalysts, and a solid oxide activator-support. The methods of this invention include precontacting the metallocene catalyst and an organoaluminum cocatalyst with an olefin, typically but not necessarily, a monomer to be polymerized or copolymerized, prior to contacting this precontacted mixture with the solid oxide activator-support.

The present invention further comprises new catalyst compositions, methods for preparing catalyst compositions, and methods for polymerizing olefins that result in improved productivity. In one aspect, these methods can be carried out without the need for using large excess concentrations of the expensive cocatalyst methyl aluminoxane (MAO), or the catalyst composition can be substantially free of MAO. However, this invention also provides a catalyst composition comprising an ansa-metallocene compound and an aluminoxane. In this aspect, the catalyst composition is not required to comprise either an acidic activator-support wherein the activator-support comprises a chemically-treated solid oxide, and the catalyst composition is also not required to comprise an organoaluminum compound.

Additionally, this invention encompasses a process comprising contacting at least one monomer and the catalyst composition under polymerization conditions to produce the polymer. Thus, this invention comprises methods for polymerizing olefins using the catalyst compositions prepared as described herein.

The present invention also encompasses new polyolefins.

This invention also comprises an article that comprises the polymer produced with the catalyst composition of this invention.

These and other features, aspects, embodiments, and advantages of the present invention will become apparent after a review of the following detailed description of the disclosed features.

The following patent applications are incorporated by reference herein in their entireties: U.S. patent application Ser. No. 10/877,039; U.S. patent application Ser. No. 10/876,891; U.S. patent application Ser. No. 10/876,948, now U.S. Pat. No. 7,064,225; and U.S. patent application Ser. No. 10/877,021.

DETAILED DESCRIPTION OF THE INVENTION

Figure 1:
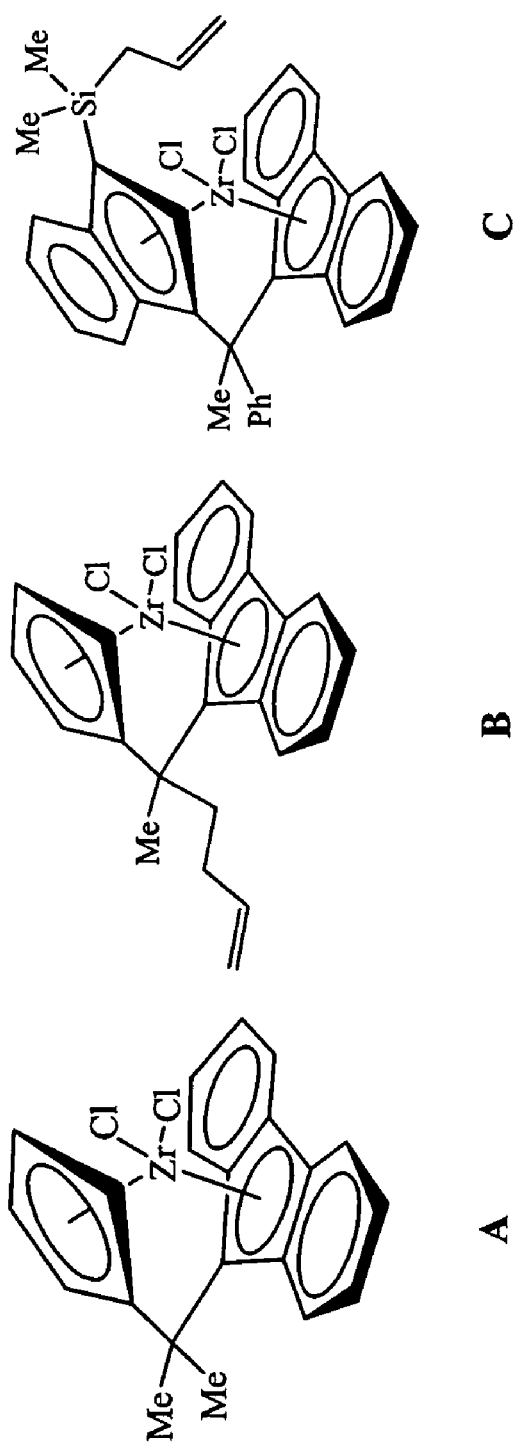
FIG. 1 illustrates the specific structures of the metallocenes used in the Examples and Tables.

The present invention provides new catalyst compositions, methods for preparing catalyst compositions, methods for using the catalyst compositions to polymerize olefins, olefin polymers and articles prepared therefrom. In one aspect, this invention encompasses a catalyst composition comprising a tightly-bridged ansa-metallocene compound containing an olefin functionality pendant to at least one of the cyclopentadienyl-type ligands, a solid oxide activator-support, and an organoaluminum compound. In another aspect, this invention comprises methods for making and using the catalyst composition.

Catalyst Composition and Components

The Metallocene Compound

In one aspect, the present invention provides a catalyst composition comprising a bridged or ansa-metallocene compound containing a pendant unsaturated moiety attached to a cyclopentadienyl-type ligand, along with a solid oxide activator-support and an organoaluminum compound further disclosed herein.

As used herein, the term ansa-metallocene refers simply to a metallocene compound in which the two $\eta^5$-cycloalkadienyl-type ligands in the molecule are linked by a bridging moiety. Useful ansa-metallocenes are typically "tightly-bridged", meaning that the two $\eta^5$-cycloalkadienyl-type ligands are connected by a bridging group wherein the shortest link of the bridging moiety between the $\eta^5$-cycloalkadienyl-type ligands is a single atom. Thus, the length of the bridge or the chain between the two $\eta^5$-cycloalkadienyl-type ligands is one atom, although this bridging atom can be substituted. The metallocenes of this invention are therefore bridged bis($\eta^5$-cycloalkadienyl)-type compounds, wherein the $\eta^5$-cycloalkadienyl portions include cyclopentadienyl ligands, indenyl ligands, fluorenyl ligands, and the like, including substituted analogs of any of these.

Further, at least one of the $\eta^5$-cycloalkadienyl-type ligands is substituted with a pendant unsaturated group. That is, one substituent of the substituted bridging group comprises an unsaturated group, wherein the unsaturated group can be an alkenyl group, an alkynyl group, an alkadienyl group, or a substituted analog thereof. In one aspect of the invention, one substituent of the substituted bridging group comprises an alkenyl group, in which case the ansa-metallocenes may be described as containing a chain with a pendant olefin attached to at least one of the $\eta^5$-cycloalkadienyl-type ligands. Further, the pendant unsaturated moiety attached to a cyclopentadienyl-type ligand can be bonded to the cyclopentadienyl-type ligand through a silicon-moiety, a carbon moiety, a germanium moiety, a tin moiety, or through other atoms. Typically, the pendant unsaturated moiety is bonded to a cyclopentadienyl-type ligand through a silicon-moiety.

In one aspect, the ansa-metallocene of this invention comprises a compound having the formula:

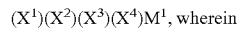

$(X^1)(X^2)(X^3)(X^4)M^1$, wherein $M^1$ is titanium, zirconium, or hafnium;

$(X^1)$ and $(X^2)$ are independently selected from a cyclopentadienyl, an indenyl, a fluorenyl, or a substituted analog thereof, wherein at least one of $(X^1)$ and $(X^2)$ is substituted;

at least one substituent of the substituted $(X^1)$ or $(X^2)$ comprises an unsaturated group having the formula

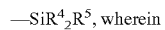

—SiR$^4_2$R$^5$, wherein each R$^4$ is independently selected from a hydrocarbyl group or a substituted hydrocarbyl group having from 1 to about 20 carbon atoms;

R$^5$ is an alkenyl group, an alkynyl group, an alkadienyl group, or a substituted analog thereof having from 1 to about 20 carbon atoms;

$(X^1)$ and $(X^2)$ are connected by a substituted or unsubstituted bridging group comprising one atom bonded to both $(X^1)$ and $(X^2)$, wherein the atom is carbon, silicon, germanium, or tin; and any substituent on R$^4$, any substituent on R$^5$, any substituent on the substituted bridging group, any additional substituent on $(X^1)$ or $(X^2)$, and $(X^3)$ and $(X^4)$ are independently selected from an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any of which having from 1 to about 20 carbon atoms; a halide; or hydrogen;

The linkage that connects $(X^1)$ and $(X^2)$, that is, the shortest link of the bridging moiety, is a single atom wherein the atom can be a carbon, silicon, germanium, or tin atom. In one aspect, the bridging atom is a carbon or silicon atom, in which case the bridge comprises a substituted methylene (or methylidene) group or a substituted silylene group.

In one aspect, at least one substituent of the substituted $(X^1)$ or $(X^2)$ comprises an unsaturated group having the formula

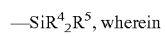

—SiR$^4_2$R$^5$, wherein each R$^4$ is independently selected from a hydrocarbyl group or a substituted hydrocarbyl group having from 1 to about 20 carbon atoms;

R$^5$ is an alkenyl group, an alkynyl group, an alkadienyl group, or a substituted analog thereof having from 1 to about 20 carbon atoms;

In another aspect, at least one substituent of the cyclopentadienyl-type ligands comprises an unsaturated group, wherein the unsaturated group is an alkenyl group, an alkynyl group, an alkadienyl group, or a substituted analog thereof, any of which has from 1 to about 20 carbon atoms. In yet another aspect, this substituent of the cyclopentadienyl-type ligands can comprise an alkenyl group or a substituted alkenyl group. Examples of alkenyl groups include, but are not limited to, propenyl, butenyl, pentenyl, hexenyl, heptenyl, or octenyl. In another aspect, the alkenyl group can be 2-propenyl, 3-butenyl or 4-pentenyl. Thus, in one aspect, the pendant unsaturated group can contain the carbon-carbon double bond from about 3 to about 7 atoms removed from the cyclopentadienyl-type ligand itself, and in another aspect, from 3 to about 4 carbon atoms removed from the cyclopentadienyl-type ligand itself.

In addition to an alkenyl, alkynyl, or alkadienyl group, any other substituent on the cyclopentadienyl-type ligand, or any substitutent on the bridging atom, when present, is independently selected from an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any of which having from 1 to about 20 carbon atoms; a halide; or hydrogen. Further, this description of other substituents on the cyclopentadienyl-type ligand or on the bridging atom can include substituted, unsubstituted, branched, linear, or heteroatom-substituted analogs of these moieties. Further, it is not necessary that the bridging atom be substituted. For example, the bridge connecting $(X^1)$ and $(X^2)$ can simply comprises a methylene $(CH_2)$ group. Typically, the bridge connecting $(X^1)$ and $(X^2)$ comprises a group such as $CMe_2$, $C(Me)(Ph)$, $CPh_2$, and the like.

Examples of unsaturated groups that can be bonded to the cyclopentadienyl-type ligand include, but are not limited to, 2-propenyl(dimethylsilyl) $(SiMe_2CH_2CH=CH_2)$, 3-butenyl (dimethylsilyl) $(SiMe_2CH_2CH_2CH=CH_2)$, 4-pentenyl(dimethylsilyl) $(SiMe_2CH_2CH_2CH_2CH=CH_2)$, 5-hexenyl(dimethylsilyl) $(SiMe_2CH_2CH_2CH_2CH_2CH=CH_2)$, 6-heptenyl (dimethylsilyl) $(SiMe_2CH_2CH_2CH_2CH_2CH_2CH=CH_2)$, 7-octenyl(dimethylsilyl) $(SiMe_2CH_2CH_2CH_2CH_2CH_2CH_2CH=CH_2)$, 3-methyl-3-butenyl(dimethylsilyl) $(SiMe_2CH_2CH_2C(CH_3)=CH_2)$, 4-methyl-3-pentenyl(dimethylsilyl) $(SiMe_2CH_2CH_2CH=C(CH_3)_2)$, or a substituted analog thereof. In one aspect, the unsaturated group bonded to at least one cyclopentadienyl-type ligand can include, but is not limited to, 2-propenyl (dimethylsilyl) $(SiMe_2CH_2CH=CH_2)$, 3-butenyl(dimethylsilyl) $(SiMe_2CH_2CH_2CH=CH_2)$, 4-pentenyl(dimethylsilyl) $(SiMe_2CH_2CH_2CH_2CH=CH_2)$, or a substituted analog thereof.

In addition to containing a bridging group, $(X^1)$ and $(X^2)$ may also have other substituents. Further, the alkenyl, alkynyl, or alkadienyl group bonded to a cyclopentadienyl-type ligand may also have substituents. For example, the $R^4$ and $R^5$ groups of the $—SiR^4{}_2R^5$ substituent can be substituted as well. These substituents are selected from the same chemical groups or moieties that can serve as the $(X^3)$ and $(X^4)$ ligands of the ansa-metallocenes. Thus, any substituent on $R^4$, any substituent on $R^5$, any substituent on the substituted bridging group, any additional substituent on $(X^1)$ or $(X^2)$, and $(X^3)$ and $(X^4)$ can be independently selected from an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any of which having from 1 to about 20 carbon atoms; a halide; or hydrogen; as long as these groups do not terminate the activity of the catalyst composition. Further, this list includes substituents that may be characterized in more than one of these categories such as benzyl. This list also includes hydrogen, therefore the notion of a substituted indenyl and substituted fluorenyl includes partially saturated indenyls and fluorenyls including, but not limited to, tetrahydroindenyls, tetrahydrofluorenyls, and octahydrofluorenyls.

Examples of each of these substituent groups include, but are not limited to, the following groups. In each example presented below, unless otherwise specified, R is independently selected from: an aliphatic group; an aromatic group; a cyclic group; any combination thereof; any substituted derivative thereof, including but not limited to, a halide-, an alkoxide-, or an amide-substituted derivative thereof; any of which has from 1 to about 20 carbon atoms; or hydrogen. Also included in these groups are any unsubstituted, branched, or linear analogs thereof.

Examples of aliphatic groups, in each occurrence, include, but are not limited to, an alkyl group, a cycloalkyl group, an alkenyl group, a cycloalkenyl group, an alkynyl group, an alkadienyl group, a cyclic group, and the like, and includes all substituted, unsubstituted, branched, and linear analogs or derivatives thereof, in each occurrence having from one to about 20 carbon atoms. Thus, aliphatic groups include, but are not limited to, hydrocarbyls such as paraffins and alkenyls. For example, aliphatic groups as used herein include methyl, ethyl, propyl, n-butyl, tert-butyl, sec-butyl, isobutyl, amyl, isoamyl, hexyl, cyclohexyl, heptyl, octyl, nonyl, decyl, dodecyl, 2-ethylhexyl, pentenyl, butenyl, and the like.

Examples of aromatic groups, in each occurrence, include, but are not limited to, phenyl, naphthyl, anthracenyl, and the like, including substituted derivatives thereof, in each occurrence having from 6 to about 25 carbons. Substituted derivatives of aromatic compounds include, but are not limited to, tolyl, xylyl, mesityl, and the like, including any heteroatom substituted derivative thereof.

Examples of cyclic groups, in each occurrence, include, but are not limited to, cycloparaffins, cycloolefins, cycloacetylenes, arenes such as phenyl, bicyclic groups and the like, including substituted derivatives thereof, in each occurrence having from about 3 to about 20 carbon atoms. Thus heteroatom-substituted cyclic groups such as furanyl are included herein.

In each occurrence, aliphatic and cyclic groups are groups comprising an aliphatic portion and a cyclic portion, examples of which include, but are not limited to, groups such as: $—(CH_2)_mC_6H_qR_{5-q}$ wherein m is an integer from 1 to about 10, and q is an integer from 1 to 5, inclusive; $—(CH_2)_m C_6H_qR_{11-q}$ wherein m is an integer from 1 to about 10, and q is an integer from 1 to 11, inclusive; or $—(CH_2)_mC_5H_qR_{9-q}$ wherein m is an integer from 1 to about 10, and q is an integer from 1 to 9, inclusive. In each occurrence and as defined above, R is independently selected from: an aliphatic group; an aromatic group; a cyclic group; any combination thereof; any substituted derivative thereof, including but not limited to, a halide-, an alkoxide-, or an amide-substituted derivative thereof; any of which has from 1 to about 20 carbon atoms; or hydrogen. In one aspect, aliphatic and cyclic groups include, but are not limited to: $—CH_2C_6H_5$; $—CH_2C_6H_4F$; $—CH_2C_6H_4Cl$; $—CH_2C_6H_4Br$; $—CH_2C_6H_4I$; $—CH_2C_6H_4OMe$; $—CH_2C_6H_4OEt$; $—CH_2C_6H_4NH_2$; $—CH_2C_6H_4NMe_2$; $—CH_2C_6H_4NEt_2$; $—CH_2CH_2C_6H_5$; $—CH_2CH_2C_6H_4F$; $—CH_2CH_2C_6H_4Cl$; $—CH_2CH_2C_6H_4Br$; $—CH_2CH_2C_6H_4I$; $—CH_2CH_2C_6H_4OMe$; $—CH_2CH_2C_6H_4OEt$; $—CH_2CH_2C_6H_4NH_2$;

—CH$_2$CH$_2$C$_6$H$_4$NMe$_2$; —CH$_2$CH$_2$C$_6$H$_4$NEt$_2$; any regioisomer thereof, and any substituted derivative thereof.

Examples of halides, in each occurrence, include fluoride, chloride, bromide, and iodide.

In each occurrence, oxygen groups are oxygen-containing groups, examples of which include, but are not limited to, alkoxy or aryloxy groups (—OR), —OC(O)R, —OC(O)H, —OSiR$_3$, —OPR$_2$, —OAlR$_2$, and the like, including substituted derivatives thereof, wherein R in each occurrence can be alkyl, cycloalkyl, aryl, aralkyl, substituted alkyl, substituted aryl, or substituted aralkyl having from 1 to about 20 carbon atoms. Examples of alkoxy or aryloxy groups (—OR) groups include, but are not limited to, methoxy, ethoxy, propoxy, butoxy, phenoxy, substituted phenoxy, and the like.

In each occurrence, sulfur groups are sulfur-containing groups, examples of which include, but are not limited to, —SR, —OSO$_2$R, —OSO$_2$OR, —SCN, —SO$_2$R, and the like, including substituted derivatives thereof, wherein R in each occurrence can be alkyl, cycloalkyl, aryl, aralkyl, substituted alkyl, substituted aryl, or substituted aralkyl having from 1 to about 20 carbon atoms.

In each occurrence, nitrogen groups are nitrogen-containing groups, which include, but are not limited to, —NH$_2$, —NHR, —NR$_2$, —NO$_2$, —N$_3$, and the like, including substituted derivatives thereof, wherein R in each occurrence can be alkyl, cycloalkyl, aryl, aralkyl, substituted alkyl, substituted aryl, or substituted aralkyl having from 1 to about 20 carbon atoms.

In each occurrence, phosphorus groups are phosphorus-containing groups, which include, but are not limited to, —PH$_2$, —PHR, —PR$_2$, —P(O)R$_2$, —P(OR)$_2$, —P(O)(OR)$_2$, and the like, including substituted derivatives thereof, wherein R in each occurrence can be alkyl, cycloalkyl, aryl, aralkyl, substituted alkyl, substituted aryl, or substituted aralkyl having from 1 to about 20 carbon atoms.

In each occurrence, arsenic groups are arsenic-containing groups, which include, but are not limited to, —AsHR, —AsR$_2$, —As(O)R$_2$, —As(OR)$_2$, —As(O)(OR)$_2$, and the like, including substituted derivatives thereof, wherein R in each occurrence can be alkyl, cycloalkyl, aryl, aralkyl, substituted alkyl, substituted aryl, or substituted aralkyl having from 1 to about 20 carbon atoms.

In each occurrence, carbon groups are carbon-containing groups, which include, but are not limited to, alkyl halide groups that comprise halide-substituted alkyl groups with 1 to about 20 carbon atoms, aralkyl groups with 1 to about 20 carbon atoms, —C(O)H, —C(O)R, —C(O)OR, cyano, —C(NR)H, —C(NR)R, —C(NR)OR, and the like, including substituted derivatives thereof, wherein R in each occurrence can be alkyl, cycloalkyl, aryl, aralkyl, substituted alkyl, substituted aryl, or substituted aralkyl having from 1 to about 20 carbon atoms.

In each occurrence, silicon groups are silicon-containing groups, which include, but are not limited to, silyl groups such alkylsilyl groups, arylsilyl groups, arylalkylsilyl groups, siloxy groups, and the like, which in each occurrence have from 1 to about 20 carbon atoms. For example, silicon groups include trimethylsilyl and phenyloctylsilyl groups.

In each occurrence, germanium groups are germanium-containing groups, which include, but are not limited to, germyl groups such alkylgermyl groups, arylgermyl groups, arylalkylgermyl groups, germyloxy groups, and the like, which in each occurrence have from 1 to about 20 carbon atoms.

In each occurrence, tin groups are tin-containing groups, which include, but are not limited to, stannyl groups such alkylstannyl groups, arylstannyl groups, arylalkylstannyl groups, stannoxy (or "stannyloxy") groups, and the like, which in each occurrence have from 1 to about 20 carbon atoms. Thus, tin groups include, but are not limited to, stannoxy groups.

In each occurrence, lead groups are lead-containing groups, which include, but are not limited to, alkyllead groups, aryllead groups, arylalkyllead groups, and the like, which in each occurrence, have from 1 to about 20 carbon atoms.

In each occurrence, boron groups are boron-containing groups, which include, but are not limited to, —BR$_2$, —BX$_2$, —BRX, wherein X is a monoanionic group such as halide, hydride, alkoxide, alkyl thiolate, and the like, and wherein R in each occurrence can be alkyl, cycloalkyl, aryl, aralkyl, substituted alkyl, substituted aryl, or substituted aralkyl having from 1 to about 20 carbon atoms.

In each occurrence, aluminum groups are aluminum-containing groups, which include, but are not limited to, —AlR$_2$, —AlX$_2$, —AlRX, wherein X is a monoanionic group such as halide, hydride, alkoxide, alkyl thiolate, and the like, and wherein R in each occurrence can be alkyl, cycloalkyl, aryl, aralkyl, substituted alkyl, substituted aryl, or substituted aralkyl having from 1 to about 20 carbon atoms.

Examples of inorganic groups that may be used as substituents for substituted cyclopentadienyls, substituted indenyls, substituted fluorenyls, and substituted boratabenzenes, in each occurrence, include, but are not limited to, —SO$_2$X, —OAlX$_2$, —OSiX$_3$, —OPX$_2$, —SX, —OSO$_2$X, —AsX$_2$, —As(O)X$_2$, —PX$_2$, and the like, wherein X is a monoanionic group such as halide, hydride, amide, alkoxide, alkyl thiolate, and the like, and wherein any alkyl, cycloalkyl, aryl, aralkyl, substituted alkyl, substituted aryl, or substituted aralkyl group or substituent on these ligands has from 1 to about 20 carbon atoms.

Examples of organometallic groups that may be used as substituents for substituted cyclopentadienyls, substituted indenyls, and substituted fluorenyls, in each occurrence, include, but are not limited to, organoboron groups, organoaluminum groups, organogallium groups, organosilicon groups, organogermanium groups, organotin groups, organolead groups, organo-transition metal groups, and the like, having from 1 to about 20 carbon atoms.

In another aspect of this invention, (X$^3$) and (X$^4$) are independently selected from an aliphatic group, a cyclic group, a combination of an aliphatic group and a cyclic group, an amido group, a phosphido group, an alkyloxide group, an aryloxide group, an organometallic group, or a substituted derivative thereof, any of which having from 1 to about 20 carbon atoms; or a halide. In another aspect, (X$^3$) and (X$^4$) are independently selected from a hydrocarbyl having from 1 to about 10 carbon atoms, or a halide. In another aspect, (X$^3$) and (X$^4$) are independently selected from fluoride, chloride, bromide, or iodide. In yet another aspect, (X$^3$) and (X$^4$) are chloride.

Numerous processes to prepare metallocene compounds that can be employed in this invention have been reported. For example, U.S. Pat. Nos. 4,939,217, 5,191,132, 5,210,352, 5,347,026, 5,399,636, 5,401,817, 5,420,320, 5,436,305, 5,451,649, 5,496,781, 5,498,581, 5,541,272, 5,554,795, 5,563,284, 5,565,592, 5,571,880, 5,594,078, 5,631,203, 5,631,335, 5,654,454, 5,668,230, 5,705,578, 5,705,579, 6,187,880, and 6,509,427 describe such methods, each of which is incorporated by reference herein, in its entirety. Other processes to prepare metallocene compounds that can be employed in this invention have been reported in references such as: Köppl, A. Alt, H. G. *J. Mol. Catal. A.* 2001, 165, 23; Kajigaeshi, S.; Kadowaki, T.; Nishida, A.; Fujisaki, S. *The Chemical Society of Japan,* 1986, 59, 97; Alt, H. G.; Jung, M.; Kehr, G. *J. Organomet. Chem.* 1998, 562, 153-181; and Alt, H. G.; Jung, M. *J. Organomet. Chem.* 1998, 568, 87-112; each of which is incorporated by reference herein, in its entirety. For example, the following ansa metallocene compound is prepared according to Alt, H. G.; Jung, M.; Kehr, G. *J. Organomet. Chem.* 1998, 562, 153-181:

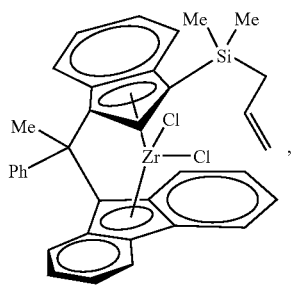

(IV)

and analogous compounds can be prepared according to an analogous method using starting compounds that will be readily understood by one of ordinary skill.

The following treatises also describe such methods: Wailes, P. C.; Coutts, R. S. P.; Weigold, H. in Organometallic Chemistry of Titanium, Zironium, and Hafnium, Academic; New York, 1974; Cardin, D. J.; Lappert, M. F.; and Raston, C. L.; Chemistry of Organo-Zirconium and -Hafnium Compounds; Halstead Press; New York, 1986; each of which is incorporated by reference herein, in its entirety.

In yet another aspect of this invention, examples of the ansa-metallocene that are useful in the catalyst composition of this invention include a compound with the formula I:

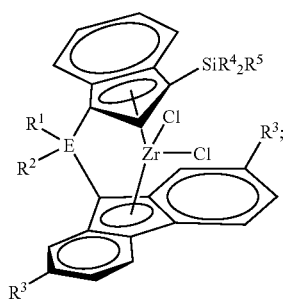

(I)

wherein E is carbon, silicon, germanium, or tin; $R^1$, $R^2$, $R^3$, and $R^4$ are independently selected from H or a hydrocarbyl group having from 1 to about 12 carbon atoms; and $R^5$ is an alkenyl group having from about 3 to about 12 carbon atoms.

In another aspect, examples of the ansa-metallocene that are useful in the catalyst composition of this invention include a compound with the formula I:

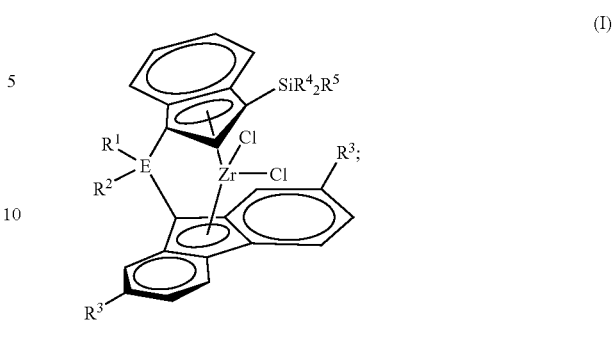

(I)

wherein E is carbon or silicon; $R^1$, $R^2$, and $R^4$ are independently selected from methyl or phenyl; $R^3$ is H or t-butyl; and $R^5$ is 2-propenyl ($CH_2CH=CH_2$), 3-butenyl ($CH_2CH_2CH=CH_2$), 4-pentenyl ($CH_2CH_2CH_2CH=CH_2$), 5-hexenyl ($CH_2CH_2CH_2CH_2CH=CH_2$), 6-heptenyl ($CH_2CH_2CH_2CH_2CH_2CH=CH_2$), 7-octenyl ($CH_2CH_2CH_2CH_2CH_2CH_2CH=CH_2$), 3-methyl-3-butenyl ($CH_2CH_2C(CH_3)=CH_2$), or 4-methyl-3-pentenyl ($CH_2CH_2CH=C(CH_3)_2$).

In still another aspect of this invention, the ansa-metallocene of the catalyst composition can be a compound with the formula:

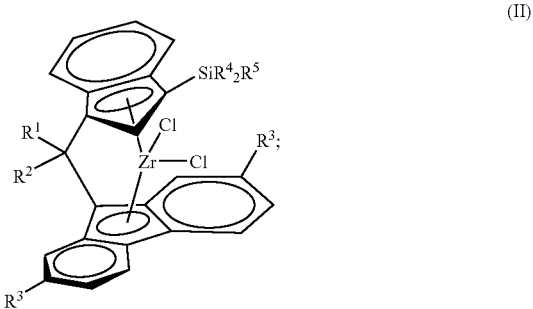

(II)

wherein $R^1$ and $R^2$ are independently selected from methyl or phenyl; $R^3$ is H or t-butyl; each $R^4$ is independently selected from methyl, ethyl, propyl, or butyl; and $R^5$ is selected from 2-propenyl ($CH_2CH=CH_2$), 3-butenyl ($CH_2CH_2CH=CH_2$), or 4-pentenyl ($CH_2CH_2CH_2CH=CH_2$).

In another aspect, the ansa-metallocene of the catalyst composition can be a compound with the formula:

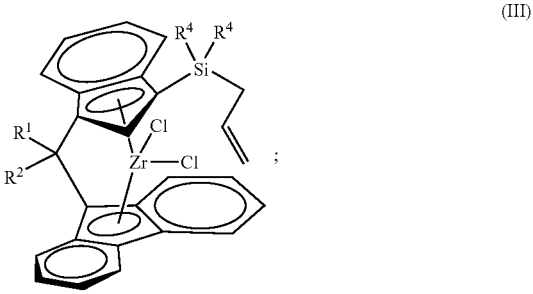

(III)

wherein $R^1$ and $R^2$ are independently selected from methyl or phenyl; and each $R^4$ is independently methyl, ethyl, propyl, or butyl. Typically, and in another aspect, the ansa-metallocene of the catalyst composition can be a compound with the formula:

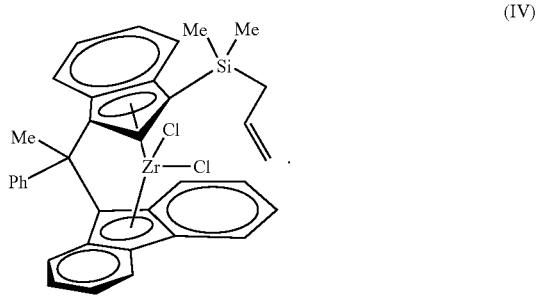

(IV)

In another aspect of this invention, the ansa-metallocene of this invention may be selected from:

1-($\eta^5$-3-(2-propenyldimethylsilyl)indenyl)-1-($\eta^5$-9-fluorenyl)-1-phenylethane zirconium dichloride;

1-($\eta^5$-3-(2-propenyldimethylsilyl)indenyl)-1-($\eta^5$-2,7-di-t-butyl-9-fluorenyl)-1-phenylethane zirconium dichloride;

1-($\eta^5$-3-(2-propenyldimethylsilyl)indenyl)-1-($\eta^5$-9-fluorenyl)-1-methylethane zirconium dichloride;

1-($\eta^5$-3-(2-propenyldimethylsilyl)indenyl)-1-($\eta^5$-2,7-di-t-butyl-9-fluorenyl)-1-methylethane zirconium dichloride;

or any combination thereof.

The Organoaluminum Compound

In one aspect, the present invention provides a catalyst composition comprising an ansa-metallocene compound containing a pendant unsaturated moiety attached to the bridge, a solid oxide activator-support, and an organoaluminum compound. Organoaluminum compounds that can be used in this invention include, but are not limited to compound with the formula:

$Al(X^5)_n(X^6)_{3-n}$, wherein $(X^5)$ is a hydrocarbyl having from 1 to about 20 carbon atoms; $(X^6)$ is alkoxide or aryloxide, any of which having from 1 to about 20 carbon atoms, halide, or hydride; and n is a number from 1 to 3, inclusive. In one aspect, $(X^5)$ is an alkyl having from 1 to about 10 carbon atoms. Examples of $(X^5)$ moieties include, but are not limited to, methyl, ethyl, propyl, butyl, hexyl, heptyl, octyl, and the like. In another aspect, examples of $(X^5)$ moieties include, but are not limited to, methyl, ethyl, isopropyl, n-propyl, n-butyl, sec-butyl, isobutyl, 1-hexyl, 2-hexyl, 3-hexyl, isohexyl, heptyl, octyl, and the like. In another aspect, $(X^6)$ may be independently selected from fluoride, chloride, bromide, methoxide, ethoxide, or hydride. In yet another aspect, $(X^6)$ may be chloride.

In the formula $Al(X^5)_n(X^6)_{3-n}$, n is a number from 1 to 3 inclusive, and typically, n is 3. The value of n is not restricted to be an integer, therefore this formula includes sesquihalide compounds or other organoaluminum cluster compounds.

Generally, examples of organoaluminum compounds that can be used in this invention include, but are not limited to, trialkylaluminum compounds, dialkylaluminium halide compounds, dialkylaluminum alkoxide compounds, dialkylaluminum hydride compounds, and combinations thereof. Examples of organoaluminum compounds that are useful in this invention include, but are not limited to: trimethylaluminum, triethylaluminum, tripropylaluminum, tributylaluminum, triisobutylaluminum, trihexylaluminum, triisohexyla- luminum, trioctylaluminum, diethylaluminum ethoxide, diisobutylaluminum hydride, diethylaluminum chloride, or any combination thereof.

In one aspect, the present invention comprises precontacting the ansa-metallocene with at least one organoaluminum compound and an olefin monomer to form a precontacted mixture, prior to contact this precontacted mixture with the solid oxide activator-support to form the active catalyst. When the catalyst composition is prepared in this manner, typically, though not necessarily, a portion of the organoaluminum compound is added to the precontacted mixture and another portion of the organoaluminum compound is added to the postcontacted mixture prepared when the precontacted mixture is contacted with the solid oxide activator. However, all of the organoaluminum compound may be used to prepare the catalyst in either the precontacting or postcontacting step. Alternatively, all the catalyst components may be contacted in a single step.

Further, more than one organoaluminum compounds may be used, in either the precontacting or the postcontacting step. When an organoaluminum compound is added in multiple steps, the amounts of organoaluminum compound disclosed herein include the total amount of organoaluminum compound used in both the precontacted and postcontacted mixtures, and any additional organoaluminum compound added to the polymerization reactor. Therefore, total amounts of organoaluminum compounds are disclosed, regardless of whether a single organoaluminum compound is used, or more than one organoaluminum compound. In another aspect, triethylaluminum (TEA) or triisobutylaluminum are typical organoaluminum compounds used in this invention.

The Activator-Support

In one aspect, the present invention encompasses catalyst compositions comprising an acidic activator-support, which can comprise a chemically-treated solid oxide, and which is typically used in combination with an organoaluminum compound. In another aspect, the activator-support comprises at least one solid oxide treated with at least one electron-withdrawing anion; wherein the solid oxide can be silica, alumina, silica-alumina, aluminophosphate, aluminum phosphate, zinc aluminate, heteropolytungstates, titania, zirconia, magnesia, boria, zinc oxide, mixed oxides thereof, or mixtures thereof; and wherein the electron-withdrawing anion can be fluoride, chloride, bromide, phosphate, triflate, bisulfate, sulfate, fluoroborate, fluorosulfate, trifluoroacetate, fluorophosphates, fluorozirconate, fluorosilicate, fluorotitanate, permanganate, substituted sulfonate, unsubstituted sulfonate, or any combination thereof.

The activator-support includes the contact product of at least one solid oxide compound and at least one electron-withdrawing anion source. In one aspect, the solid oxide compound comprises an inorganic oxide. The solid oxide can be optionally calcined prior to contacting the electron-withdrawing anion source. The contact product may also be calcined either during or after the solid oxide compound is contacted with the electron-withdrawing anion source. In this aspect, the solid oxide compound may be calcined or uncalcined. In another aspect, the activator-support may comprise the contact product of at least one calcined solid oxide compound and at least one electron-withdrawing anion source.

The activator-support exhibits enhanced activity as compared to the corresponding untreated solid oxide compound. The activator-support also functions as a catalyst activator as compared to the corresponding untreated solid oxide. While not intending to be bound by theory, it is believed that the activator-support may function as an ionizing solid oxide compound by weakening the metal-ligand bond between an anionic ligand and the metal in the metallocene. However, the activator-support is an activator regardless of whether it is ionizes the metallocene, abstracts an anionic ligand to form an ion pair, weakens the metal-ligand bond in the metallocene, simply coordinates to an anionic ligand when it contacts the activator-support, or any other mechanisms by which activation may occur. While the activator-support activates the metallocene in the absence of cocatalysts, it is not necessary to eliminate cocatalysts from the catalyst composition. The activation function of the activator-support is evident in the enhanced activity of catalyst composition as a whole, as compared to a catalyst composition containing the corresponding untreated solid oxide. However, it is believed that the activator-support can function as an activator, even in the absence of an organoaluminum compound, aluminoxanes, organoboron compounds, or ionizing ionic compounds.

In one aspect, the activator-support of this invention comprises a solid inorganic oxide material, a mixed oxide material, or a combination of inorganic oxide materials, that is chemically-treated with an electron-withdrawing component, and optionally treated with at least one other metal ion. Thus, the solid oxide of this invention encompasses oxide materials such as alumina, "mixed oxide" compounds such as silica-alumina or silica-zirconia or silica-titania, and combinations and mixtures thereof. The mixed metal oxide compounds such as silica-alumina, with more than one metal combined with oxygen to form a solid oxide compound, can be made by co-gellation, impregnation or chemical deposition, and are encompassed by this invention.

In one aspect of this invention, the activator-support further comprises a metal or metal ion such as zinc, nickel, vanadium, silver, copper, gallium, tin, tungsten, molybdenum, or any combination thereof. Examples of activator-supports that further comprise a metal or metal ion include, but are not limited to, zinc-impregnated chlorided alumina, zinc-impregnated fluorided alumina, zinc-impregnated chlorided silica-alumina, zinc-impregnated fluorided silica-alumina, zinc-impregnated sulfated alumina, or any combination thereof.

In another aspect, the activator-support of this invention comprises a solid oxide of relatively high porosity, which exhibits Lewis acidic or Brønsted acidic behavior. The solid oxide is chemically-treated with an electron-withdrawing component, typically an electron-withdrawing anion, to form a activator-support. While not intending to be bound by the following statement, it is believed that treatment of the inorganic oxide with an electron-withdrawing component augments or enhances the acidity of the oxide. Thus, the activator-support exhibits Lewis or Brønsted acidity which is typically greater than the Lewis or Brønsted acidity of the untreated solid oxide. One method to quantify the acidity of the chemically-treated and untreated solid oxide materials is by comparing the polymerization activities of the treated and untreated oxides under acid catalyzed reactions.

In one aspect, the chemically-treated solid oxide comprises a solid inorganic oxide comprising oxygen and at least one element selected from Group 2, 3, 4, 5, 6, 7, 8, 9, 10, 11, 12, 13, 14, or 15 of the periodic table, or comprising oxygen and at least one element selected from the lanthanide or actinide elements. (See: *Hawley's Condensed Chemical Dictionary*, 11$^{th}$ Ed., John Wiley & Sons; 1995; Cotton, F. A.; Wilkinson, G.; Murillo; C. A.; and Bochmann; M. *Advanced Inorganic Chemistry*, 6$^{th}$ Ed., Wiley-Interscience, 1999.) Usually, the inorganic oxide comprises oxygen and at least one element selected from Al, B, Be, Bi, Cd, Co, Cr, Cu, Fe, Ga, La, Mn, Mo, Ni, Sb, Si, Sn, Sr, Th, Ti, V, W, P, Y, Zn or Zr.

Suitable examples of solid oxide materials or compounds that can be used in the chemically-treated solid oxide of the present invention include, but are not limited to, $Al_2O_3$, $B_2O_3$, BeO, $Bi_2O_3$, CdO, $Co_3O_4$, $Cr_2O_3$, CuO, $Fe_2O_3$, $Ga_2O_3$, $La_2O_3$, $Mn_2O_3$, $MoO_3$, NiO, $P_2O_5$, $Sb_2O_5$, $SiO_2$, $SnO_2$, SrO, $ThO_2$, $TiO_2$, $V_2O_5$, $WO_3$, $Y_2O_3$, ZnO, $ZrO_2$, and the like, including mixed oxides thereof, and combinations thereof. Examples of mixed oxides that can be used in the activator-support of the present invention include, but are not limited to, mixed oxides of any combination of Al, B, Be, Bi, Cd, Co, Cr, Cu, Fe, Ga, La, Mn, Mo, Ni, P, Sb, Si, Sn, Sr, Th, Ti, V, W, Y, Zn, Zr, and the like. Examples of mixed oxides that can be used in the activator-support of the present invention also include, but are not limited to, silica-alumina, silica-titania, silica-zirconia, zeolites, many clay minerals, pillared clays, alumina-titania, alumina-zirconia, aluminophosphate, and the like.

In one aspect of this invention, the solid oxide material is chemically-treated by contacting it with at least one electron-withdrawing component, typically an electron-withdrawing anion source. Further, the solid oxide material is optionally chemically-treated with at least one other metal ion, that can be the same as or different from any metal element that constitutes the solid oxide material, then calcining to form a metal-containing or metal-impregnated chemically-treated solid oxide. Alternatively, a solid oxide material and an electron-withdrawing anion source are contacted and calcined simultaneously. The method by which the oxide is contacted with an electron-withdrawing component, typically a salt or an acid of an electron-withdrawing anion, includes, but is not limited to, gelling, co-gelling, impregnation of one compound onto another, and the like. Typically, following any contacting method, the contacted mixture of oxide compound, electron-withdrawing anion, and optionally the metal ion is calcined.

The electron-withdrawing component used to treat the oxide is any component that increases the Lewis or Brønsted acidity of the solid oxide upon treatment. In one aspect, the electron-withdrawing component is an electron-withdrawing anion derived from a salt, an acid, or other compound such as a volatile organic compound that may serve as a source or precursor for that anion. Examples of electron-withdrawing anions include, but are not limited to, fluoride, chloride, bromide, iodide, phosphate, triflate, bisulfate, sulfate, fluoroborate, fluorosulfate, trifluoroacetate, phosphate, fluorophosphate, fluorozirconate, fluorosilicate, fluorotitanate, permanganate, substituted sulfonate, unsubstituted sulfonate, and the like, including any mixtures and combinations thereof. In addition, other ionic or non-ionic compounds that serve as sources for these electron-withdrawing anions may also be employed in the present invention. In one aspect, the chemically-treated solid oxide comprises a sulfated solid oxide, and in another aspect, the chemically-treated oxide comprises sulfated alumina.

When the electron-withdrawing component comprises a salt of an electron-withdrawing anion, the counterion or cation of that salt may be any cation that allows the salt to revert or decompose back to the acid during calcining. Factors that dictate the suitability of the particular salt to serve as a source for the electron-withdrawing anion include, but are not limited to, the solubility of the salt in the desired solvent, the lack of adverse reactivity of the cation, ion-pairing effects between the cation and anion, hygroscopic properties imparted to the salt by the cation, and the like, and thermal stability of the anion. Examples of suitable cations in the salt of the electron-withdrawing anion include, but are not limited to, ammonium, trialkyl ammonium, tetraalkyl ammonium, tetraalkyl phosphonium, $H^+$, $[H(OEt_2)_2]^+$, and the like.

Further, combinations of one or more different electron withdrawing anions, in varying proportions, can be used to tailor the specific acidity of the activator-support to the desired level. Combinations of electron withdrawing components may be contacted with the oxide material simultaneously or individually, and any order that affords the desired activator-support acidity. For example, one aspect of this invention is employing two or more electron-withdrawing anion source compounds in two or more separate contacting steps. Thus, one example of such a process by which an activator-support is prepared is as follows: a selected solid oxide compound, or combination of oxide compounds, is contacted with a first electron-withdrawing anion source compound to form a first mixture, this first mixture is then calcined, the calcined first mixture is then contacted with a second electron-withdrawing anion source compound to form a second mixture, followed by calcining said second mixture to form a treated solid oxide compound. In such a process, the first and second electron-withdrawing anion source compounds are typically different compounds, although they may be the same compound.

In one aspect of the invention, the solid oxide activator-support is produced by a process comprising:

1) contacting a solid oxide compound with at least one electron-withdrawing anion source compound to form a first mixture; and 2) calcining the first mixture to form the solid oxide activator-support.

In another aspect of this invention, the solid oxide activator-support is produced by a process comprising:

1) contacting at least one solid oxide compound with a first electron-withdrawing anion source compound to form a first mixture; and 2) calcining the first mixture to produce a calcined first mixture;

3) contacting the calcined first mixture with a second electron-withdrawing anion source compound to form a second mixture; and 4) calcining the second mixture to form the solid oxide activator-support. Thus, the solid oxide activator-support is sometimes referred to simply as a treated solid oxide compound.

Another aspect of this invention producing or forming the solid oxide activator-support by contacting at least one solid oxide with at least one electron-withdrawing anion source compound, wherein the at least one solid oxide compound is calcined before, during or after contacting the electron-withdrawing anion source, and wherein there is a substantial absence of aluminoxanes and organoborates.

In one aspect of this invention, once the solid oxide has been treated and dried, may be subsequently calcined. Calcining of the treated solid oxide is generally conducted in an ambient or inert atmosphere, typically in a dry ambient atmosphere, at a temperature from about 200° C. to about 900° C., and for a time of about 1 minute to about 100 hours. In another aspect, calcining is conducted at a temperature from about 300° C. to about 800° C. and in another aspect, calcining is conducted at a temperature from about 400° C. to about 700° C. In yet another aspect, calcining is conducted from about 1 hour to about 50 hours, and in another aspect calcining is conducted, from about 3 hours to about 20 hours. In still another aspect, calcining may be carried out from about 1 to about 10 hours at a temperature from about 350° C. to about 550° C.

Further, any type of suitable ambient can be used during calcining. Generally, calcining is conducted in an oxidizing atmosphere, such as air. Alternatively, an inert atmosphere, such as nitrogen or argon, or a reducing atmosphere such as hydrogen or carbon monoxide, may be used.

In another aspect of the invention, the solid oxide component used to prepare the chemically-treated solid oxide has a pore volume greater than about 0.1 cc/g. In another aspect, the solid oxide component has a pore volume greater than about 0.5 cc/g, and in yet another aspect, greater than about 1.0 cc/g. In still another aspect, the solid oxide component has a surface area from about 100 to about 1000 $m^2/g$. In another aspect, solid oxide component has a surface area from about 200 to about 800 $m^2/g$, and in still another aspect, from about 250 to about 600 $m^2/g$.

The solid oxide material may be treated with a source of halide ion or sulfate ion, or a combination of anions, and optionally treated with at least one metal ion, then calcined to provide the activator-support in the form of a particulate solid. In one aspect, the solid oxide material is treated with a source of sulfate, termed a sulfating agent, a source of chloride ion, termed a chloriding agent, a source of fluoride ion, termed a fluoriding agent, or a combination thereof, and calcined to provide the solid oxide activator. In another aspect, useful acidic activator-supports include, but are not limited to: bromided alumina; chlorided alumina; fluorided alumina; sulfated alumina; bromided silica-alumina, chlorided silica-alumina; fluorided silica-alumina; sulfated silica-alumina; bromided silica-zirconia, chlorided silica-zirconia; fluorided silica-zirconia; sulfated silica-zirconia; chlorided zinc-alumina, triflate treated silica-alumina, a pillared clay such as a pillared montmorillonite, optionally treated with fluoride, chloride, or sulfate; phosphated alumina, or other aluminophosphates, optionally treated with sulfate, fluoride, or chloride; or any combination thereof. Further, any of the activator-supports may optionally be treated with at least one other metal ion, typically from a metal salt or compound, wherein the metal ion can be the same as or different from any metal that makes up the solid oxide material.

In one aspect of this invention, the treated oxide activator-support comprises a fluorided solid oxide in the form of a particulate solid, thus a source of fluoride ion is added to the oxide by treatment with a fluoriding agent. In still another aspect, fluoride ion may be added to the oxide by forming a slurry of the oxide in a suitable solvent such as alcohol or water, including, but are not limited to, the one to three carbon alcohols because of their volatility and low surface tension. Examples of fluoriding agents that can be used in this invention include, but are not limited to, hydrofluoric acid (HF), ammonium fluoride ($NH_4F$), ammonium bifluoride ($NH_4HF_2$), ammonium tetrafluoroborate ($NH_4BF_4$), ammonium silicofluoride (hexafluorosilicate) (($NH_4)_2SiF_6$), ammonium hexafluorophosphate ($NH_4PF_6$), tetrafluoroboric acid ($HBF_4$), ammonium hexafluorotitanate ($(NH_4)_2TiF_6$, ammonium hexafluorozirconate ($(NH_4)_2ZrF_6$, analogs thereof, and combinations thereof. For example, ammonium bifluoride $NH_4HF_2$ may be used as the fluoriding agent, due to its ease of use and ready availability.

In another aspect of the present invention, the solid oxide can be treated with a fluoriding agent during the calcining step. Any fluoriding agent capable of thoroughly contacting the solid oxide during the calcining step can be used. For example, in addition to those fluoriding agents described previously, volatile organic fluoriding agents may be used. Examples of volatile organic fluoriding agents useful in this aspect of the invention include, but are not limited to, freons, perfluorohexane, perfluorobenzene, fluoromethane, trifluoroethanol, and combinations thereof. Gaseous hydrogen fluoride or fluorine itself can also be used with the solid oxide is fluorided during calcining. One convenient method of contacting the solid oxide with the fluoriding agent is to vaporize a fluoriding agent into a gas stream used to fluidize the solid oxide during calcination.

Similarly, in another aspect of this invention, the chemically-treated solid oxide comprises a chlorided solid oxide in the form of a particulate solid, thus a source of chloride ion is added to the oxide by treatment with a chloriding agent. The chloride ion may be added to the oxide by forming a slurry of the oxide in a suitable solvent. In another aspect of the present invention, the solid oxide can be treated with a chloriding agent during the calcining step. Any chloriding agent capable of serving as a source of chloride and thoroughly contacting the oxide during the calcining step can be used. For example, volatile organic chloriding agents may be used. Examples of volatile organic chloriding agents useful in this aspect of the invention include, but are not limited to, certain freons, perchlorobenzene, chloromethane, dichloromethane, chloroform, carbon tetrachloride, trichloroethanol, or any combination thereof. Gaseous hydrogen chloride or chlorine itself can also be used with the solid oxide during calcining. One convenient method of contacting the oxide with the chloriding agent is to vaporize a chloriding agent into a gas stream used to fluidize the solid oxide during calcination.

When the activator-support comprises a chemically-treated solid oxide comprising a solid oxide treated with an electron-withdrawing anion, the electron withdrawing anion can be typically added to the solid oxide in an amount greater than about 1% by weight of the solid oxide. In another aspect the electron withdrawing anion can be added to the solid oxide in an amount greater than about 2% by weight of the solid oxide, greater than about 3% by weight of the solid oxide, greater than about 5% by weight of the solid oxide, or greater than about 7% by weight of the solid oxide.

In one aspect, the amount of electron-withdrawing ion, for example fluoride or chloride ion, present before calcining the solid oxide is generally from about 2 to about 50% by weight, where the weight percents are based on the weight of the solid oxide, for example silica-alumina, before calcining. In another aspect, the amount of electron-withdrawing ion, for example fluoride or chloride ion, present before calcining the solid oxide is from about 3 to about 25% by weight, and in another aspect, from about 4 to about 20% by weight. When halide ion is used as the electron-withdrawing anion, it is used in an amount sufficient to deposit, after calcining, from about 0.1% to about 50% by weight halide ion relative to the weight of the solid oxide. In another aspect, halide is used in an amount sufficient to deposit, after calcining, from about 0.5% to about 40% by weight halide ion relative to the weight of the solid oxide, or from about 1% to about 30% by weight halide ion relative to the weight of the solid oxide. If the fluoride or chloride ion is added during calcining, such as when calcined in the presence of $CCl_4$, there is typically no, or only trace levels, of fluoride or chloride ion in the solid oxide before calcining. Once impregnated with halide, the halided oxide may be dried by any method known in the art including, but not limited to, suction filtration followed by evaporation, drying under vacuum, spray drying, and the like, although it is also possible to initiate the calcining step immediately without drying the impregnated solid oxide.

The silica-alumina used to prepare the treated silica-alumina can have a pore volume greater than about 0.5 cc/g. In one aspect, the pore volume may be greater than about 0.8 cc/g, and in another aspect, the pore volume may be greater than about 1.0 cc/g. Further, the silica-alumina may have a surface area greater than about 100 $m^2/g$. In one aspect, the surface area is greater than about 250 $m^2/g$, and in another aspect, the surface area may be greater than about 350 $m^2/g$. Generally, the silica-alumina of this invention has an alumina content from about 5 to about 95%. In one aspect, the alumina content of the silica-alumina may be from about 5 to about 50%, and in another aspect, the alumina content of the silica-alumina may be from about 8% to about 30% alumina by weight.

The sulfated solid oxide comprises sulfate and a solid oxide component such as alumina or silica-alumina, in the form of a particulate solid. Optionally, the sulfated oxide is further treated with a metal ion such that the calcined sulfated oxide comprises a metal. In one aspect, the sulfated solid oxide comprises sulfate and alumina. In one aspect of this invention, the sulfated alumina is formed by a process wherein the alumina is treated with a sulfate source, including for example, but not limited to, sulfuric acid or a sulfate salt such as ammonium sulfate, zinc sulfate, aluminum sulfate, nickel sulfate or copper sulfate. In one aspect, this process may be performed by forming a slurry of the alumina in a suitable solvent such as alcohol or water, in which the desired concentration of the sulfating agent has been added. Suitable organic solvents include, but are not limited to, the one to three carbon alcohols because of their volatility and low surface tension.

In this aspect, the amount of sulfate ion present before calcining is generally from about 1% to about 50% by weight, from about 2% to about 30% by weight, of from about 5% to about 25% by weight, where the weight percents are based on the weight of the solid oxide before calcining. Once impregnated with sulfate, the sulfated oxide may be dried by any method known in the art including, but not limited to, suction filtration followed by evaporation, drying under vacuum, spray drying, and the like, although it is also possible to initiate the calcining step immediately.

In addition to being treated with an electron-withdrawing component such as halide or sulfate ion, the solid inorganic oxide of this invention may optionally be treated with a metal source, including metal salts or metal-containing compounds. In one aspect of the invention, these compounds may be added to or impregnated onto the solid oxide in solution form, and subsequently converted into the supported metal upon calcining. Accordingly, the solid inorganic oxide can further comprise a metal selected from zinc, nickel, vanadium, silver, copper, gallium, tin, tungsten, molybdenum, or a combination thereof. For example, zinc may be used to impregnate the solid oxide because it provides good catalyst activity and low cost. The solid oxide may be treated with metal salts or metal-containing compounds before, after, or at the same time that the solid oxide is treated with the electron-withdrawing anion.

Further, any method of impregnating the solid oxide material with a metal may be used. The method by which the oxide is contacted with a metal source, typically a salt or metal-containing compound, includes, but is not limited to, gelling, co-gelling, impregnation of one compound onto another, and the like. Following any contacting method, the contacted mixture of oxide compound, electron-withdrawing anion, and the metal ion is typically calcined. Alternatively, a solid oxide material, an electron-withdrawing anion source, and the metal salt or metal-containing compound are contacted and calcined simultaneously.

In another aspect, the ansa-metallocene compound may be contacted with an olefin monomer and an organoaluminum cocatalyst for a first period of time prior to contacting this mixture with the acidic activator-support. Once the precontacted mixture of metallocene, monomer, organoaluminum cocatalyst is contacted with the acidic activator-support, the composition further comprising the acidic activator-support is termed the "postcontacted" mixture. The postcontacted mixture may be allowed to remain in further contact for a second period of time prior to being charged into the reactor in which the polymerization process will be carried out.

Various processes to prepare solid oxide activator-supports that can be employed in this invention have been reported. For example, U.S. Pat. Nos. 6,107,230, 6,165,929, 6,294,494, 6,300,271, 6,316,553, 6,355,594, 6,376,415, 6,391,816, 6,395,666, 6,524,987, and 6,548,441, describe such methods, each of which is incorporated by reference herein, in its entirety.

Ion-Exchangeable Activator-Supports and Layered Mineral Activator-Supports

In one aspect of this invention, the activator-support used in preparing the catalyst compositions of this invention can comprise an ion-exchangeable activator-support, including but not limited to silicate and aluminosilicate compounds or minerals, either with layered or non-layered structures, and any combination thereof. In another aspect of this invention, ion-exchangeable, layered aluminosilicates such as pillared clays may be used as activator-supports. When the acidic activator-support comprises an ion-exchangeable activator-support, it can optionally be treated with at least one electron-withdrawing anion such as those disclosed herein, though typically the ion-exchangeable activator-support is not treated with an electron-withdrawing anion.

In one aspect, the activator-support of this invention can comprise clay minerals having exchangeable cations and layers capable of expanding. Typical clay mineral activator-supports include, but are not limited to, ion-exchangeable, layered aluminosilicates such as pillared clays. Although the term "support" is used, it is not meant to be construed as an inert component of the catalyst composition, but rather is to be considered an active part of the catalyst composition, because of its intimate association with the ansa-metallocene and organoaluminum catalyst components. While not intending to be bound by theory, it is believed that the ion exchangeable activator-support serves as an insoluble reactant that reacts with the ansa-metallocene and organoaluminum components to form a catalyst composition used to produce polymer.

In one aspect, the clay materials of this invention encompass materials either in their natural state or that have been treated with various ions by wetting, ion exchange, or pillaring. Typically, the clay material activator-support of this invention comprises clays that have been ion exchanged with large cations, including polynuclear, highly charged metal complex cations. However, the clay material activator-supports of this invention also encompass clays that have been ion exchanged with simple salts, including, but not limited to, salts of Al(III), Fe(II), Fe(III) and Zn(II) with ligands such as halide, acetate, sulfate, nitrate, or nitrite.

In one aspect, the clay activator-support of this invention comprises pillared clays. The term pillared clays is used to refer to clay materials that have been ion exchanged with large, typically polynuclear, highly charged metal complex cations. Examples of such ions include, but are not limited to, Keggin ions which may have charges such as 7+, various polyoxometallates, and other large ions. Thus, the term pillaring refers to a simple exchange reaction in which the exchangeable cations of a clay material are replaced with large, highly charged ions, such as Keggin ions. These polymeric cations are then immobilized within the interlayers of the clay and when calcined are coverted to metal oxide "pillars," effectively supporting the clay layers as column-like structures. Thus, once the clay is dried and calcined to produce the supporting pillars between clay layers, the expanded lattice structure is maintained and the porosity is enhanced. The resulting pores may vary in shape and size as a function of the pillaring material and the parent clay material used. Examples of pillaring and pillared clays are found in: T. J. Pinnavaia, Science 220 (4595), 365-371 (1983); J. M. Thomas, Intercalation Chemistry, (S. Whittington and A. Jacobson, eds.) Ch. 3, pp. 55-99, Academic Press, Inc., (1972); U.S. Pat. No. 4,452,910; U.S. Pat. No. 5,376,611; and U.S. Pat. No. 4,060,480; each of which is incorporated herein in its entirety.

The pillaring process utilizes clay minerals having exchangeable cations and layers capable of expanding. Any pillared clay that can enhance the polymerization of olefins in the catalyst composition of the present invention can be used. Therefore, suitable clay minerals for pillaring include, but are not limited to: allophanes; smectites, both dioctahedral (Al) and tri-octahedral (Mg) and derivatives thereof such as montmorillonites (bentonites), nontronites, hectorites, or laponites; halloysites; vermiculites; micas; fluoromicas; chlorites; mixed-layer clays; the fiberous clays including but not limited to sepiolites, attapulgites, and palygorskites; a serpentine clay; illite; laponite; saponite; or any combination thereof. In one aspect, the pillared clay activator-support comprises bentonite or montmorillonite. The principal component of bentonite is montmorillonite.

The pillared clay may be pretreated in the present invention. For example, in one embodiment, a pillared bentonite was pretreated by drying at about 300° C. under an inert atmosphere, typically dry nitrogen, for about 3 hours, before being added to the polymerization reactor. This example of a pretreatment is not limiting, because preheating steps such as this many be carried out at many other temperatures and times, including a combination of temperature and time steps, all of which are encompassed by this invention.

The ion-exchangeable activator-supports such as pillared clays used to prepare the catalyst compositions of this invention can be combined with other inorganic support materials, including, but are not limited to, zeolites, inorganic oxides, phosphated inorganic oxides, and the like. In one aspect, typical support materials that can be used in this regard include, but are not limited to, silica, silica-alumina, alumina, titania, zirconia, magnesia, boria, fluorided alumina, silated alumina, thoria, aluminophosphate, aluminum phosphate, zinc aluminate, phosphated silica, phosphated alumina, silica-titania, coprecipitated silica/titania, fluorided/silated alumina, and any combination or mixture thereof.

The amount of ansa-metallocene compound in relation to the ion-exchangable activator-support used to prepare the catalyst composition of this invention is typically from about 0.1 wt % to about 15 wt % ansa-metallocene complex, based on the weight of the activator-support component (not based on the final metallocene-clay mixture). It was also found that from about 1 wt % to about 10 wt % ansa-metallocene works well to afford a catalyst that operates at desired activities.

The mixture of ansa-metallocene and clay activator-support can be contacted and mixed for any length of time to allow thorough contact between the ansa-metallocene and activator-support. Sufficient deposition of the metallocene component on the clay may be achieved without heating a mixture of clay and metallocene complex. For example, the ansa-metallocene compound and the clay material are simply mixed from about room temperature to about 200° F. in order to achieve the deposition of the ansa-metallocene on the clay activator-support. In another aspect, the ansa-metallocene compound and the clay material are mixed from about 100° F. to about 180° F. in order to achieve the deposition of the ansa-metallocene on the clay activator-support.

In another aspect, the present invention encompasses catalyst compositions comprising an acidic activator-support, which can comprise a layered mineral. The term "layered mineral" is used herein to describe materials such as clay minerals, pillared clays, ion-exchanged clays, exfoliated clays, exfoliated clays gelled into another oxide matrix, layered minerals mixed or diluted with other materials, and the like, or any combination thereof. When the acidic activator-support comprises a layered mineral, it can optionally be treated with at least one electron-withdrawing anion such as those disclosed herein, though typically the layered mineral is not treated with an electron-withdrawing anion. For example, at least one clay mineral can be used as the activator-support.

Clay minerals generally include the large group of finely-crystalline, sheet-like layered minerals that are found in nature in fine-grained sediments, sedimentary rocks, and the like, and which constitute a class of hydrous silicate and aluminosilicate minerals with sheet-like structures and very high surface areas. This term is also used to describe hydrous magnesium silicates with a phyllosilicate structure. Examples of clay minerals that can be used in this invention include, but are not limited to, allophanes; smectites, both dioctahedral (Al) and tri-octahedral (Mg) and derivatives thereof such as montmorillonites (bentonites), nontronites, hectorites, or laponites; halloysites; vermiculites; micas; fluoromicas; chlorites; mixed-layer clays; the fiberous clays including but not limited to sepiolites, attapulgites, and palygorskites; a serpentine clay; illite; laponite; saponite; or any combination thereof. Many common clay minerals belong to the kaolinite, montmorillonite, or illite groups of clays. Pillared clays can also be used as the activator-support of this invention, as disclosed herein. Pillared claims comprise clay minerals, typically of the of the smectite group and other phylosilicates in addition to sepiolites and palygorskites, that have been ion exchanged with large, typically polynuclear, highly charged metal complex cations.

In one aspect of this invention, when layered minerals are used as activator-supports or metallocene activators, the layered minerals are typically calcined prior to their use as activators. Typical calcination temperatures can range from about 100° C. to about 700° C., from about 150° C. to about 500° C., or from about 200° C. to about 400° C.

Non-Limiting Examples of the Catalyst Composition

Examples of the catalyst composition of this invention include, but are not limited to the following. In one aspect, the catalyst composition can comprise, or can comprise the contact product of, at least one ansa-metallocene, at least one organoaluminum compound, and at least one activator-support, wherein:

a) the ansa-metallocene comprises:

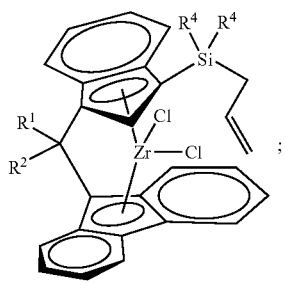

(III)

wherein $R^1$ and $R^2$ are independently selected from methyl or phenyl; and each $R^4$ is independently selected from methyl, ethyl, propyl, or butyl;

b) the organoaluminum comprises triethylaluminum, triisobutylaluminum, or a combination thereof; and c) the activator-support comprises a sulfated or a fluorided solid oxide.

In another aspect, this invention provides a catalyst composition comprising the contact product of at least one ansa-metallocene, at least one organoaluminum compound, and at least one activator-support, wherein:

a) the ansa-metallocene comprises:

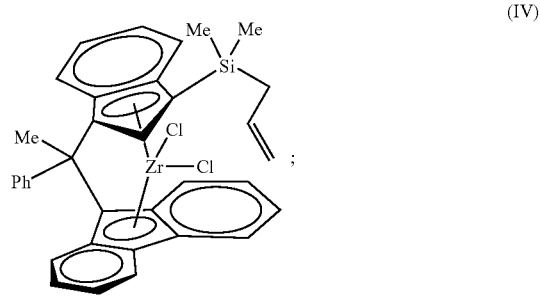

(IV)

b) the organoaluminum comprises triethylaluminum, triisobutylaluminum, or a combination thereof; and c) the activator-support comprises fluorided silica-alumina.

In a further aspect, this invention provides a catalyst composition comprising at least one precontacted metallocene, at least one precontacted organoaluminum compound, at least one precontacted olefin, and at least one postcontacted acidic activator-support, wherein:

the precontacted metallocene has the general formula I:

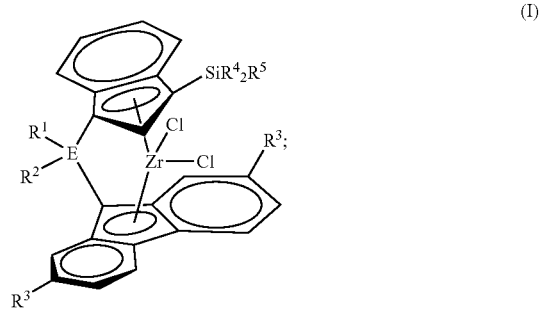

(I)

wherein E is carbon, silicon, germanium, or tin; $R^1$, $R^2$, $R^3$, and $R^4$ are independently selected from H or a hydrocarbyl group having from 1 to about 12 carbon atoms; and $R^5$ is an alkenyl group having from about 3 to about 12 carbon atoms;

the precontacted organoaluminum compound is selected from triisobutyl aluminum or triethyl aluminum;

the precontacted olefin is selected from ethylene or 1-hexene; and the postcontacted acidic activator-support comprises alumina which has been treated with sulfate ion, chloride ion, or fluoride ion; silica-alumina which has been treated with fluoride ion, or any combination thereof.

The Optional Aluminoxane Cocatalyst

In one aspect, the present invention provides a catalyst composition comprising an ansa-metallocene compound containing a pendant unsaturated moiety, an activator-support, and an organoaluminum compound, as disclosed herein. In another aspect, the present invention provides a catalyst composition comprising an optional aluminoxane cocatalyst in addition to these other components. In still another aspect, the present invention provides a catalyst composition comprising an ansa-metallocene compound containing a pendant unsaturated moiety, an aluminoxane cocatalyst, an optional activator-support, and an optional organoaluminum compound.

In another aspect, the present invention provides a catalyst composition comprising an ansa-metallocene compound and an aluminoxane. In this aspect, the catalyst composition is not required to comprise either an acidic activator-support wherein the activator-support comprises a chemically-treated solid oxide, and the catalyst composition is also not required to comprise an organoaluminum compound. Thus, any ansa-metallocene compounds disclosed herein can be combined with any of the aluminoxanes (poly(hydrocarbyl aluminum oxides)) disclosed herein, or any combination of aluminoxanes disclosed herein, to form a catalyst composition of this invention.

Aluminoxanes are also referred to as poly(hydrocarbyl aluminum oxides) or organoaluminoxanes. The other catalyst components are typically contacted with the aluminoxane in a saturated hydrocarbon compound solvent, though any solvent which is substantially inert to the reactants, intermediates, and products of the activation step can be used. The catalyst composition formed in this manner may be collected by methods known to those of skill in the art, including but not limited to filtration, or the catalyst composition may be introduced into the polymerization reactor without being isolated.

The aluminoxane compound of this invention is an oligomeric aluminum compound, wherein the aluminoxane compound can comprise linear structures, cyclic, or cage structures, or typically mixtures of all three. Cyclic aluminoxane compounds having the formula:

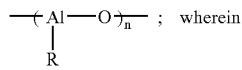
; wherein

R is a linear or branched alkyl having from 1 to 10 carbon atoms, and n is an integer from 3 to about 10 are encompassed by this invention. The $(AlRO)_n$ moiety shown here also constitutes the repeating unit in a linear aluminoxane. Thus, linear aluminoxanes having the formula:

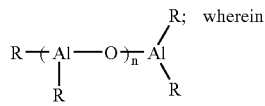
; wherein

R is a linear or branched alkyl having from 1 to 10 carbon atoms, and n is an integer from 1 to about 50, are also encompassed by this invention.

Further, aluminoxanes may also have cage structures of the formula $R^t_{5m+\alpha}R^b_{m-\alpha}Al_{4m}O_{3m}$, wherein m is 3 or 4 and $\alpha$ is $=n_{Al(3)}-n_{O(2)}+n_{O(4)}$; wherein $n_{Al(3)}$ is the number of three coordinate aluminum atoms, $n_{O(2)}$ is the number of two coordinate oxygen atoms, $n_{O(4)}$ is the number of 4 coordinate oxygen atoms, $R^t$ represents a terminal alkyl group, and $R^b$ represents a bridging alkyl group; wherein R is a linear or branched alkyl having from 1 to 10 carbon atoms.

Thus, aluminoxanes that can serve as optional cocatalysts in this invention are generally represented by formulas such as $(R-Al-O)_n$, $R(R-Al-O)_nAlR_2$, and the like, wherein the R group is typically a linear or branched $C_1$-$C_6$ alkyl such as methyl, ethyl, propyl, butyl, pentyl, or hexyl wherein n typically represents an integer from 1 to about 50. In one embodiment, the aluminoxane compounds of this invention include, but are not limited to, methylaluminoxane, ethylaluminoxane, n-propylaluminoxane, iso-propylaluminoxane, n-butylaluminoxane, t-butylaluminoxane, sec-butylaluminoxane, iso-butylaluminoxane, 1-pentylaluminoxane, 2-pentylaluminoxane, 3-pentylaluminoxane, iso-pentylaluminoxane, neopentylaluminoxane, or combinations thereof.

While organoaluminoxanes with different types of R groups are encompassed by the present invention, methyl aluminoxane (MAO), ethyl aluminoxane, or isobutyl aluminoxane are typical optional cocatalysts used in the catalyst compositions of this invention. These aluminoxanes are prepared from trimethylaluminum, triethylaluminum, or tri-isobutylaluminum, respectively, and are sometimes referred to as poly(methyl aluminum oxide), poly(ethyl aluminum oxide), and poly(isobutyl aluminum oxide), respectively. It is also within the scope of the invention to use an aluminoxane in combination with a trialkylaluminum, such as disclosed in U.S. Pat. No. 4,794,096, which is herein incorporated by reference in its entirety.

The present invention contemplates many values of n in the aluminoxane formulas $(R-Al-O)_n$ and $R(R-Al-O)_nAlR_2$, and typically n is at least about 3. However, depending upon how the organoaluminoxane is prepared, stored, and used, the value of n may be variable within a single sample of aluminoxane, and such a combination of organoaluminoxanes are comprised in the methods and compositions of the present invention.

In preparing the catalyst composition of this invention comprising an optional aluminoxane, the molar ratio of the aluminum in the aluminoxane to the metallocene in the composition is usually from about 1:10 to about 100,000:1. In one another aspect, the molar ratio of the aluminum in the aluminoxane to the metallocene in the composition is usually from about 5:1 to about 15,000:1. The amount of optional aluminoxane added to a polymerization zone is an amount within a range of about 0.01 mg/L to about 1000 mg/L, from about 0.1 mg/L to about 100 mg/L, or from about 1 mg/L to about 50 mg/L.

Organoaluminoxanes can be prepared by various procedures which are well known in the art. Examples of organoaluminoxane preparations are disclosed in U.S. Pat. Nos. 3,242,099 and 4,808,561, each of which is incorporated by reference herein, in its entirety. One example of how an aluminoxane may be prepared is as follows. Water, which is dissolved in an inert organic solvent, may be reacted with an aluminum alkyl compound such as $AlR_3$ to form the desired organoaluminoxane compound. While not intending to be bound by this statement, it is believed that this synthetic method can afford a mixture of both linear and cyclic $(R-Al-O)_n$ aluminoxane species, both of which are encompassed by this invention. Alternatively, organoaluminoxanes may be prepared by reacting an aluminum alkyl compound such as $AlR_3$ with a hydrated salt, such as hydrated copper sulfate, in an inert organic solvent.

The Optional Organoboron Cocatalyst

In one aspect, the present invention provides a catalyst composition comprising an ansa-metallocene compound containing a pendant unsaturated moiety, an activator-support, and an organoaluminum compound, as disclosed herein. In another aspect, the present invention provides a catalyst composition comprising an optional organoboron cocatalyst in addition to these other components. In still another aspect, the present invention provides a catalyst composition comprising an ansa-metallocene compound containing a pendant unsaturated moiety, an organoboron cocatalyst, an optional activator-support, and an optional organoaluminum compound.

In another aspect, the present invention provides a catalyst composition comprising an ansa-metallocene compound and an organoboron cocatalyst. In this aspect, the catalyst composition is not required to comprise either an acidic activator-support wherein the activator-support comprises a chemically-treated solid oxide, and the catalyst composition is also not required to comprise an organoaluminum compound. Thus, any ansa-metallocene compounds disclosed herein can be combined with any of the organoboron cocatalysts disclosed herein, or any combination of organoboron cocatalysts disclosed herein, to form a catalyst composition of this invention.

In one aspect, the organoboron compound comprises neutral boron compounds, borate salts, or combinations thereof. For example, the organoboron compounds of this invention can comprise a fluoroorgano boron compound, a fluoroorgano borate compound, or a combination thereof. Any fluoroorgano boron or fluoroorgano borate compound known in the art can be utilized. The term fluoroorgano boron compounds has its usual meaning to refer to neutral compounds of the form $BY_3$. The term fluoroorgano borate compound also has its usual meaning to refer to the monoanionic salts of a fluoroorgano boron compound of the form $[cation]^+[BY_4]^-$, where Y represents a fluorinated organic group. For convenience, fluoroorgano boron and fluoroorgano borate compounds are typically referred to collectively by organoboron compounds, or by either name as the context requires.

Examples of fluoroorgano borate compounds that can be used as cocatalysts in the present invention include, but are not limited to, fluorinated aryl borates such as, N,N-dimethylanilinium tetrakis(pentafluorophenyl)borate, triphenylcarbenium tetrakis(pentafluorophenyl)borate, lithium tetrakis (pentafluorophenyl)borate, N,N-dimethylanilinium tetrakis [3,5-bis(trifluoromethyl)phenyl]borate, triphenylcarbenium tetrakis[3,5-bis(trifluoromethyl)phenyl]borate, and the like, including mixtures thereof. Examples of fluoroorgano boron compounds that can be used as cocatalysts in the present invention include, but are not limited to, tris(pentafluorophenyl)boron, tris[3,5-bis(trifluoromethyl)phenyl]boron, and the like, including mixtures thereof.

Although not intending to be bound by the following theory, these examples of fluoroorgano borate and fluoroorgano boron compounds, and related compounds, are thought to form "weakly-coordinating" anions when combined with organometal compounds, as disclosed in U.S. Pat. No. 5,919, 983, which is incorporated herein by reference in its entirety.

Generally, any amount of organoboron compound can be utilized in this invention. In one aspect, the molar ratio of the organoboron compound to the metallocene compound in the composition is from about 0.1:1 to about 10:1. Typically, the amount of the fluoroorgano boron or fluoroorgano borate compound used as a cocatalyst for the metallocene is in a range of from about 0.5 mole to about 10 moles of boron compound per mole of metallocene compound. In one aspect, the amount of fluoroorgano boron or fluoroorgano borate compound used as a cocatalyst for the metallocene is in a range of from about 0.8 mole to about 5 moles of boron compound per mole of metallocene compound.

The Optional Ionizing Ionic Compound Cocatalyst

In one aspect, the present invention provides a catalyst composition comprising an ansa-metallocene compound containing a pendant unsaturated moiety, an activator-support, and an organoaluminum compound, as disclosed herein.

In another aspect, the present invention provides a catalyst composition comprising an optional ionizing ionic compound cocatalyst in addition to these other components. In still another aspect, the present invention provides a catalyst composition comprising an ansa-metallocene compound containing a pendant unsaturated moiety, an ionizing ionic compound cocatalyst, an optional activator-support, and an optional organoaluminum compound. Examples of ionizing ionic compound are disclosed in U.S. Pat. Nos. 5,576,259 and 5,807,938, each of which is incorporated herein by reference, in its entirety.

An ionizing ionic compound is an ionic compound which can function to enhance activity of the catalyst composition. While not bound by theory, it is believed that the ionizing ionic compound may be capable of reacting with the metallocene compound and converting the metallocene into a cationic metallocene compound. Again, while not intending to be bound by theory, it is believed that the ionizing ionic compound may function as an ionizing compound by completely or partially extracting an anionic ligand, possibly a non-$\eta^5$-alkadienyl ligand such as $(X^3)$ or $(X^4)$, from the metallocene. However, the ionizing ionic compound is an activator regardless of whether it is ionizes the metallocene, abstracts an $(X^3)$ or $(X^4)$ ligand in a fashion as to form an ion pair, weakens the metal-$(X^3)$ or metal-$(X^4)$ bond in the metallocene, simply coordinates to an $(X^3)$ or $(X^4)$ ligand, or any other mechanisms by which activation may occur. Further, it is not necessary that the ionizing ionic compound activate the metallocene only. The activation function of the ionizing ionic compound is evident in the enhanced activity of catalyst composition as a whole, as compared to a catalyst composition containing catalyst composition that does not comprise any ionizing ionic compound.

Examples of ionizing ionic compounds include, but are not limited to, the following compounds: tri(n-butyl)ammonium tetrakis(p-tolyl)borate, tri(n-butyl)ammonium tetrakis(m-tolyl)borate, tri(n-butyl)ammonium tetrakis (2,4-dimethylphenyl)borate, tri(n-butyl)ammonium tetrakis (3,5-dimethylphenyl)borate, tri(n-butyl)ammonium tetrakis[3,5-bis (trifluoromethyl)phenyl]borate, tri(n-butyl)ammonium tetrakis(pentafluorophenyl)borate, N,N-dimethylanilinium tetrakis(p-tolyl)borate, N,N-dimethylanilinium tetrakis(m-tolyl)borate, N,N-dimethylanilinium tetrakis(2,4-dimethylphenyl)borate, N,N-dimethylanilinium tetrakis(3,5-dimethylphenyl)borate, N,N-dimethylanilinium tetrakis[3,5-bis (trifluoromethyl)phenyl]borate, N,N-dimethylanilinium tetrakis(pentafluorophenyl)borate, triphenylcarbenium tetrakis(p-tolyl)borate, triphenylcarbenium tetrakis(m-tolyl) borate, triphenylcarbenium tetrakis (2,4-dimethylphenyl)borate, triphenylcarbenium tetrakis (3,5-dimethylphenyl) borate, triphenylcarbenium tetrakis[3,5-bis(trifluoromethyl) phenyl]borate, triphenylcarbenium tetrakis (pentafluorophenyl)borate, tropylium tetrakis(p-tolyl)borate, tropylium tetrakis(m-tolyl)borate, tropylium tetrakis(2,4-dimethylphenyl)borate, tropylium tetrakis (3,5-dimethylphenyl)borate, tropylium tetrakis[3,5-bis(trifluoromethyl)phenyl]borate, tropylium tetrakis(pentafluorophenyl)borate, lithium tetrakis(pentafluorophenyl)borate, lithium tetraphenylborate, lithium tetrakis(p-tolyl)borate, lithium tetrakis(m-tolyl)borate, lithium tetrakis (2,4-dimethylphenyl)borate, lithium tetrakis(3,5-dimethylphenyl)borate, lithium tetrafluoroborate, sodium tetrakis(pentafluorophenyl)borate, sodium tetraphenylborate, sodium tetrakis(p-tolyl)borate, sodium tetrakis(m-tolyl)borate, sodium tetrakis(2,4-dimethylphenyl)borate, sodium tetrakis (3,5-dimethylphenyl)borate, sodium tetrafluoroborate, potassium tetrakis(pentafluorophenyl)borate, potassium tetraphenylborate, potassium tetrakis(p-tolyl)borate, potassium tetrakis(m-tolyl)borate, potassium tetrakis (2,4-dimethylphenyl)borate, potassium tetrakis(3,5-dimethylphenyl)borate, potassium tetrafluoroborate, tri(n-butyl)ammonium tetrakis(p-tolyl)aluminate, tri(n-butyl)ammonium tetrakis(m-tolyl)aluminate, tri(n-butyl)ammonium tetrakis(2,4-dimethylphenyl)aluminate, tri(n-butyl)ammonium tetrakis (3,5-dimethylphenyl)aluminate, tri (n-butyl)ammonium tetrakis(pentafluorophenyl)aluminate, N,N-dimethylanilinium tetrakis(p-tolyl)aluminate, N,N-dimethylanilinium tetrakis(m-tolyl)aluminate, N,N-dimethylanilinium tetrakis(2,4-dimethylphenyl)aluminate, N,N-dimethylanilinium tetrakis(3,5-dimethylphenyl)aluminate, N,N-dimethylanilinium tetrakis(pentafluorophenyl)aluminate, triphenylcarbenium tetrakis(p-tolyl)aluminate, triphenylcarbenium tetrakis(m-tolyl)aluminate, triphenylcarbenium tetrakis(2,4-dimethylphenyl)aluminate, triphenylcarbenium tetrakis(3,5-dimethylphenyl)aluminate, triphenylcarbenium tetrakis(pentafluorophenyl)aluminate, tropylium tetrakis(p-tolyl)aluminate, tropylium tetrakis(m-tolyl)aluminate, tropylium tetrakis (2,4-dimethylphenyl)aluminate, tropylium tetrakis(3,5-dimethylphenyl)aluminate, tropylium tetrakis(pentafluorophenyl)aluminate, lithium tetrakis(pentafluorophenyl)aluminate, lithium tetraphenylaluminate, lithium tetrakis(p-tolyl)aluminate, lithium tetrakis (m-tolyl)aluminate, lithium tetrakis(2,4-dimethylphenyl) aluminate, lithium tetrakis (3,5-dimethylphenyl)aluminate, lithium tetrafluoroaluminate, sodium tetrakis(pentafluorophenyl)aluminate, sodium tetraphenylaluminate, sodium tetrakis(p-tolyl)aluminate, sodium tetrakis(m-tolyl)aluminate, sodium tetrakis(2,4-dimethylphenyl)aluminate, sodium tetrakis (3,5-dimethylphenyl)aluminate, sodium tetrafluoroaluminate, potassium tetrakis(pentafluorophenyl)aluminate, potassium tetraphenylaluminate, potassium tetrakis(p-tolyl) aluminate, potassium tetrakis(m-tolyl)aluminate, potassium tetrakis(2,4-dimethylphenyl)aluminate, potassium tetrakis (3,5-dimethylphenyl)aluminate, potassium tetrafluoroaluminate, or any combination thereof. However, the ionizing ionic compound is not limited thereto in the present invention.

The Olefin Monomer

In one aspect, the present invention encompasses a polymerization catalyst composition comprising a tightly-bridged ansa-metallocene compound containing a chain with a pendant olefin attached to the bridge, a solid oxide activator-support, and an organoaluminum compound.

Unsaturated reactants that are useful in the polymerization processes with catalyst compositions and processes of this invention include olefin compounds having from about 2 to about 30 carbon atoms per molecule and having at least one olefinic double bond. This invention encompasses homopolymerization processes using a single olefin such as ethylene or propylene, as well as copolymerization reactions with at least one different olefinic compound. In one aspect of a copolymerization reaction of ethylene, copolymers of ethylene comprise a major amount of ethylene (>50 mole percent) and a minor amount of comonomer <50 mole percent), though this is not a requirement. The comonomers that can be copolymerized with ethylene should have from three to about 20 carbon atoms in their molecular chain.

Acyclic, cyclic, polycyclic, terminal (α), internal, linear, branched, substituted, unsubstituted, functionalized, and non-functionalized olefins may be employed in this invention. For example, typical unsaturated compounds that may be polymerized with the catalysts of this invention include, but are not limited to, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-hexene, 3-ethyl-1-hexene, 1-heptene, 2-heptene, 3-heptene, the four normal octenes, the four normal nonenes, the five normal decenes, and mixtures of any two or more thereof. Cyclic and bicyclic olefins, including but not limited to, cyclopentene, cyclohexene, norbornylene, norbornadiene, and the like, may also be polymerized as described above.

In one aspect, when a copolymer is desired, the monomer ethylene may be copolymerized with a comonomer. In another aspect, examples of the comonomer include, but are not limited to, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-hexene, 3-ethyl-1-hexene, 1-heptene, 2-heptene, 3-heptene, the four normal octenes, the four normal nonenes, or the five normal decenes. In another aspect, the comonomer may be 1-butene, 1-pentene, 1-hexene, 1-octene, 1-decene, or styrene.

In one aspect, the amount of comonomer introduced into a reactor zone to produce the copolymer is generally from about 0.01 to about 10 weight percent comonomer based on the total weight of the monomer and comonomer. In another aspect, the amount of comonomer introduced into a reactor zone is from about 0.01 to about 5 weight percent comonomer, and in still another aspect, from about 0.1 to about 4 weight percent comonomer based on the total weight of the monomer and comonomer. Alternatively, an amount sufficient to give the above described concentrations by weight, in the copolymer produced can be used.

While not intending to be bound by this theory, in the event that branched, substituted, or functionalized olefins are used as reactants, it is believed that steric hindrance may impede and/or slow the polymerization process. Thus, branched and/or cyclic portion(s) of the olefin removed somewhat from the carbon-carbon double bond would not be expected to hinder the reaction in the way that the same olefin substituents situated more proximate to the carbon-carbon double bond might. In one aspect, at least one reactant for the catalyst compositions of this invention is ethylene, so the polymerizations are either homopolymerizations or copolymerizations with a different acyclic, cyclic, terminal, internal, linear, branched, substituted, or unsubstituted olefin. In addition, the catalyst compositions of this invention may be used in polymerization of diolefin compounds, including but are not limited to, 1,3-butadiene, isoprene, 1,4-pentadiene, and 1,5-hexadiene.

Preparation of the Catalyst Composition

This invention encompasses a catalyst composition and method comprising the contact product of an ansa-metallocene, a solid oxide activator-support, and an organoaluminum compound. In one aspect of this invention, the ansa-metallocene is precontacted with an olefinic monomer, not necessarily the olefin monomer to be polymerized, and an organoaluminum cocatalyst for a first period of time prior to contacting this precontacted mixture with the solid oxide activator-support. In one aspect, the first period of time for contact, the precontact time, between the ansa-metallocene, the olefinic monomer, and the organoaluminum cocatalyst typically range from time about 1 minute to about 24 hours, and from about 0.1 to about 1 hour is typical. Precontact times from about 10 minutes to about 30 minutes are also typical.

Once the precontacted mixture of ansa-metallocene, olefin monomer, and organoaluminum cocatalyst is contacted with the solid oxide activator, this composition (further comprising the solid oxide activator) is termed the postcontacted mixture. Typically, the postcontacted mixture may be allowed to remain in contact for a second period of time, the postcontact time, prior to being initiating the polymerization process.

In one aspect, postcontact times between the solid oxide activator-support and the precontacted mixture typically range from time about 1 minute to about 24 hours, and from 0.1 to about 1 hour is typical. Postcontact times from about 10 minutes to about 30 minutes are also typical.

In another aspect of this invention, the various catalyst components (for example, ansa-metallocene, activator-support, organoaluminum cocatalyst, and optionally an unsaturated hydrocarbon) can be contacted in the polymerization reactor simultaneously while the polymerization reaction is proceeding. Alternatively, any two or more of these catalyst components may be precontacted in a vessel prior to their entering the reaction zone. This precontacting step can be continuous process, in which the precontacted product is fed continuously to the reactor, or it can be a stepwise or batchwise process in which a batch of precontacted product can be added to make a catalyst composition. This precontacting step can be carried out over a time period that can range from a few seconds to as much as several days, or longer. In this aspect, the continuous precontacting step can last typically from about 1 second to about 1 hour. Also in this aspect, the continuous precontacting step can last typically from about 10 seconds to about 45 minutes, or from about 1 minute to about 30 minutes.

Alternatively the precontacting process can be carried out in multiple steps, rather than a single step, in which multiple mixtures are prepared, each comprising a different set of catalyst components. For example, at least two catalyst components can be contacted forming a first mixture, followed by contacting the first mixture with at least one other catalyst component forming a second mixture, and so forth.

Multiple precontacting steps can be carried out in a single vessel or in multiple vessels. Further, multiple precontacting steps can be carried out in series (sequentially), in parallel, or a combination thereof. For example, a first mixture of two catalyst components can be formed in a first vessel, a second mixture comprising the first mixture plus one additional catalyst component can be formed in the first vessel or in a second vessel, which is typically placed downstream of the first vessel.

In another aspect, one or more of the catalyst components may be split and used in different precontacting treatments. For example, part of a catalyst component can be fed into a first precontacting vessel for precontacting with at least one other catalyst component, while the remainder of that same catalyst component can be fed into a second precontacting vessel for precontacting with at least one other catalyst component, or can be fed directly into the reactor, or a combination thereof. The precontacting may be carried out in any suitable equipment, such as tanks, stirred mix tanks, various static mixing devices, a flask, a vessel of any type, or any combination thereof.

In one aspect, for example, a catalyst composition of this invention is prepared by contacting 1-hexene, triethylaluminum, and a zirconium ansa-metallocene such as 1-($\eta^5$-3-(2-propenyldimethylsilyl)indenyl)-1-($\eta^5$-9-fluorenyl)-1-phenylethane zirconium dichloride for at least about 30 minutes, followed by contacting this precontacted mixture with a sulfated alumina activator-support for at least about 10 minutes up to one hour to form the active catalyst.

The precontacting step typically increases the productivity of the polymer as compared to the same catalyst composition that is prepared without this precontacting step. The enhanced activity catalyst composition of this invention can be used for homopolymerization of an α-olefin monomer such as ethylene or copolymerization of an α-olefin and a comonomer.

However, neither a precontacting step nor a postcontacting step are required for this invention.

The postcontacted mixture may be heated at a temperature and for a duration sufficient to allow adsorption, impregnation, or interaction of precontacted mixture and the solid oxide activator-support, such that a portion of the components of the precontacted mixture is immobilized, adsorbed, or deposited thereon. For example, the postcontacted mixture may be heated from between about 0° F. to about 150° F. Temperatures between about 40° F. to about 95° F. are typical if the mixture is heated at all.

In one aspect, the molar ratio of the ansa-metallocene compound to the organoaluminum compound may be from about 1:1 to about 1:10,000. In another aspect, the molar ratio of the ansa-metallocene compound to the organoaluminum compound may be from about 1:1 to about 1:1,000, and in another aspect, from about 1:1 to about 1:100. These molar ratios reflect the ratio of ansa-metallocene compound to the total amount of organoaluminum compound in both the precontacted mixture and the postcontacted mixture combined.

When a precontacting step is used, generally, the molar ratio of olefin monomer to ansa-metallocene compound in the precontacted mixture may be from about 1:10 to about 100,000:1, or from about 10:1 to about 1,000:1.

In another aspect of this invention, the weight ratio of the solid oxide activator to the organoaluminum compound may range from about 1:5 to about 1,000:1. In another aspect, the weight ratio of the solid oxide activator to the organoaluminum compound may be from about 1:3 to about 100:1, and in yet another aspect, from about 1:1 to about 50:1.

In a further aspect of this invention, the weight ratio of the ansa-metallocene to solid oxide activator-support may be from about 1:1 to about 1:1,000,000. Yet another aspect of this invention is the weight ratio of the ansa-metallocene to solid oxide activator-support which may be from about 1:10 to about 1:100,000, and in another aspect, from about 1:20 to about 1:1000.

One aspect of this invention is that aluminoxane is not required to form the catalyst composition disclosed herein, a feature that allows lower polymer production costs. Accordingly, in one aspect, the present invention can use $AlR_3$-type organoaluminum compounds and an activator-support in the absence of aluminoxanes. While not intending to be bound by theory, it is believed that the organoaluminum compounds likely do not activate the metallocene catalyst in the same manner as an organoaluminoxane.

Additionally, no expensive borate compounds or $MgCl_2$ are required to form the catalyst composition of this invention, although aluminoxane, borate compounds, $MgCl_2$, or any combination thereof can optionally be used in the catalyst composition of this invention. Further, in one aspect, cocatalysts such as aluminoxanes, organoboron compounds, ionizing ionic compounds, or any combination thereof may be used as cocatalysts with the ansa-metallocene, either in the presence or in the absence of the activator-support, and either in the presence or in the absence of the organoaluminum compounds.

Thus, in one aspect, this invention provides a process to produce a catalyst composition, comprising:

contacting an ansa-metallocene, an olefin, and an organoaluminum compound for a first period of time to form a precontacted mixture comprising a precontacted ansa-metallocene, a precontacted organoaluminum compound, and a precontacted olefin; and contacting the precontacted mixture with an activator-support and optionally additional organoaluminum compound for a second period of time to form a postcontacted mixture comprising a postcontacted ansa-metallocene, a postcontacted organoaluminum compound, a postcontacted olefin, and a postcontacted activator-support. In this aspect, the precontacted ansa-metallocene can comprise a compound with the formula:

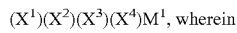

M¹ is titanium, zirconium, or hafnium;
(X¹) and (X²) are independently selected from a cyclopentadienyl, an indenyl, a fluorenyl, or a substituted analog thereof, wherein at least one of (X¹) and (X²) is substituted;
at least one substituent of the substituted (X¹) or (X²) comprises an unsaturated group having the formula

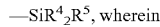

each R⁴ is independently selected from a hydrocarbyl group or a substituted hydrocarbyl group having from 1 to about 20 carbon atoms;
R⁵ is an alkenyl group, an alkynyl group, an alkadienyl group, or a substituted analog thereof having from 1 to about 20 carbon atoms;
(X¹) and (X²) are connected by a substituted or unsubstituted bridging group comprising one atom bonded to both (X¹) and (X²), wherein the atom is carbon, silicon, germanium, or tin; and
any substituent on R⁴, any substituent on R⁵, any substituent on the substituted bridging group, any additional substituent on (X¹) or (X²), and (X³) and (X⁴) are independently selected from an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, an inorganic group, an organometallic group, or a substituted derivative thereof, any of which having from 1 to about 20 carbon atoms; a halide; or hydrogen.

In one aspect, the catalyst activity of the catalyst of this invention is typically greater than or equal to about 100 grams polyethylene per gram of chemically treated solid oxide per hour (abbreviated gP/(gCTSO·hr)). In another aspect, the catalyst of this invention may be characterized by an activity of greater than or equal to about 250 gP/(gCTSO·hr), and in another aspect, an activity of greater than or equal to about 500 gP/(gCTSO·hr). In still another aspect, the catalyst of this invention may be characterized by an activity of greater than or equal to about 1000 gP/(gCTSO·hr), and in another aspect, an activity of greater than or equal to about 2000 gP/(gCTSO·hr). This activity is measured under slurry polymerization conditions, using isobutane as the diluent, and with a polymerization temperature of about 90° C., and an ethylene pressure of about 550 psig. The reactor should have substantially no indication of any wall scale, coating or other forms of fouling upon making these measurements.

Utility of the Catalyst Composition in Polymerization Processes

Polymerizations using the catalysts of this invention can be carried out in any manner known in the art. Such polymerization processes include, but are not limited to slurry polymerizations, gas phase polymerizations, solution polymerizations, and the like, including multi-reactor combinations thereof. Thus, any polymerization zone known in the art to produce ethylene-containing polymers can be utilized. For example, a stirred reactor can be utilized for a batch process, or the reaction can be carried out continuously in a loop reactor or in a continuous stirred reactor.

After catalyst activation, a catalyst composition is used to homopolymerize ethylene, or copolymerize ethylene with a comonomer. In one aspect, a typical polymerization method is a slurry polymerization process (also known as the particle form process), which is well known in the art and is disclosed, for example in U.S. Pat. No. 3,248,179, which is incorporated by reference herein, in its entirety. Other polymerization methods of the present invention for slurry processes are those employing a loop reactor of the type disclosed in U.S. Pat. No. 3,248,179, and those utilized in a plurality of stirred reactors either in series, parallel, or combinations thereof, wherein the reaction conditions are different in the different reactors, which is also incorporated by reference herein, in its entirety.

In one aspect, polymerization temperature for this invention may range from about 60° C. to about 280° C., and in another aspect, polymerization reaction temperature may range from about 70° C. to about 110° C.

The polymerization reaction typically occurs in an inert atmosphere, that is, in atmosphere substantial free of oxygen and under substantially anhydrous conditions, thus, in the absence of water as the reaction begins. Therefore a dry, inert atmosphere, for example, dry nitrogen or dry argon, is typically employed in the polymerization reactor.

The polymerization reaction pressure can be any pressure that does not terminate the polymerization reaction, and it typically conducted at a pressure higher than the pretreatment pressures. In one aspect, polymerization pressures may be from about atmospheric pressure to about 1000 psig. In another aspect, polymerization pressures may be from about 50 psig to about 800 psig. Further, hydrogen can be used in the polymerization process of this invention to control polymer molecular weight.

Polymerizations using the catalysts of this invention can be carried out in any manner known in the art. Such processes that can polymerize monomers into polymers include, but are not limited to slurry polymerizations, gas phase polymerizations, solution polymerizations, and multi-reactor combinations thereof. Thus, any polymerization zone known in the art to produce olefin-containing polymers can be utilized. For example, a stirred reactor can be utilized for a batch process, or the reaction can be carried out continuously in a loop reactor or in a continuous stirred reactor. Typically, the polymerizations disclosed herein are carried out using a slurry polymerization process in a loop reaction zone. Suitable diluents used in slurry polymerization are well known in the art and include hydrocarbons which are liquid under reaction conditions. The term "diluent" as used in this disclosure does not necessarily mean an inert material, as this term is meant to include compounds and compositions that may contribute to polymerization process. Examples of hydrocarbons that can be used as diluents include, but are not limited to, cyclohexane, isobutane, n-butane, propane, n-pentane, isopentane, neopentane, and n-hexane. Typically, isobutane is used as the diluent in a slurry polymerization. Examples of this technology are found in U.S. Pat. Nos. 4,424,341; 4,501,885; 4,613,484; 4,737,280; and 5,597,892; each of which is incorporated by reference herein, in its entirety.

For purposes of the invention, the term polymerization reactor includes any polymerization reactor or polymerization reactor system known in the art that is capable of polymerizing olefin monomers to produce homopolymers or copolymers of the present invention. Such reactors can comprise slurry reactors, gas-phase reactors, solution reactors, or any combination thereof. Gas phase reactors can comprise fluidized bed reactors or tubular reactors. Slurry reactors can comprise vertical loops or horizontal loops. Solution reactors can comprise stirred tank or autoclave reactors.

Polymerization reactors suitable for the present invention can comprise at least one raw material feed system, at least one feed system for catalyst or catalyst components, at least one reactor system, at least one polymer recovery system or any suitable combination thereof. Suitable reactors for the present invention can further comprise any, or combination of, a catalyst storage system, an extrusion system, a cooling system, a diluent recycling system, or a control system. Such reactors can comprise continuous take-off and direct recycling of catalyst, diluent, and polymer. Generally, continuous processes can comprise the continuous introduction of a monomer, a catalyst, and a diluent into a polymerization reactor and the continuous removal from this reactor of a suspension comprising polymer particles and the diluent.

Polymerization reactor systems of the present invention can comprise one type of reactor per system or multiple reactor systems comprising two or more types of reactors operated in parallel or in series. Multiple reactor systems can comprise reactors connected together to perform polymerization, or reactors that are not connected. The polymer can be polymerized in one reactor under one set of conditions, and then the polymer can be transferred to a second reactor for polymerization under a different set of conditions.

In one aspect of the invention, the polymerization reactor system can comprise at least one loop slurry reactor. Such reactors are known in the art and can comprise vertical or horizontal loops. Such loops can comprise a single loop or a series of loops. Multiple loop reactors can comprise both vertical and horizontal loops. The slurry polymerization can be performed in an organic solvent that can disperse the catalyst and polymer. Examples of suitable solvents include butane, hexane, cyclohexane, octane, and isobutane. Monomer, solvent, catalyst and any comonomer are continuously fed to a loop reactor where polymerization occurs. Polymerization can occur at low temperatures and pressures. Reactor effluent can be flashed to remove the solid resin.

In yet another aspect of this invention, the polymerization reactor can comprise at least one gas phase reactor. Such systems can employ a continuous recycle stream containing one or more monomers continuously cycled through the fluidized bed in the presence of the catalyst under polymerization conditions. The recycle stream can be withdrawn from the fluidized bed and recycled back into the reactor. Simultaneously, polymer product can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone.

In still another aspect of the invention, the polymerization reactor can comprise a tubular reactor. Tubular reactors can make polymers by free radical initiation, or by employing the catalysts typically used for coordination polymerization. Tubular reactors can have several zones where fresh monomer, initiators, or catalysts are added. Monomer can be entrained in an inert gaseous stream and introduced at one zone of the reactor. Initiators, catalysts, and/or catalyst components can be entrained in a gaseous stream and introduced at another zone of the reactor. The gas streams are intermixed for polymerization. Heat and pressure can be employed appropriately to obtain optimal polymerization reaction conditions.

In another aspect of the invention, the polymerization reactor can comprise a solution polymerization reactor. During solution polymerization, the monomer is contacted with the catalyst composition by suitable stirring or other means. A carrier comprising an inert organic diluent or excess monomer can be employed. If desired, the monomer can be brought in the vapor phase into contact with the catalytic reaction product, in the presence or absence of liquid material. The polymerization zone is maintained at temperatures and pressures that will result in the formation of a solution of the polymer in a reaction medium. Agitation can be employed during polymerization to obtain better temperature control and to maintain uniform polymerization mixtures throughout the polymerization zone. Adequate means are utilized for dissipating the exothermic heat of polymerization. The polymerization can be effected in a batch manner, or in a continuous manner. The reactor can comprise a series of at least one separator that employs high pressure and low pressure to separate the desired polymer.

In a further aspect of the invention, the polymerization reactor system can comprise the combination of two or more reactors. Production of polymers in multiple reactors can include several stages in at least two separate polymerization reactors interconnected by a transfer device making it possible to transfer the polymers resulting from the first polymerization reactor into the second reactor. The desired polymerization conditions in one of the reactors can be different from the operating conditions of the other reactors. Alternatively, polymerization in multiple reactors can include the manual transfer of polymer from one reactor to subsequent reactors for continued polymerization. Such reactors can include any combination including, but not limited to, multiple loop reactors, multiple gas reactors, a combination of loop and gas reactors, a combination of autoclave reactors or solution reactors with gas or loop reactors, multiple solution reactors, or multiple autoclave reactors.

After the polymers are produced, they can be formed into various articles, including but not limited to, household containers, utensils, film products, drums, fuel tanks, pipes, geomembranes, and liners. Various processes can form these articles. Usually, additives and modifiers are added to the polymer in order to provide desired effects. By using the invention described herein, articles can likely be produced at a lower cost, while maintaining most or all of the unique properties of polymers produced with metallocene catalysts.

Ethylene Polymers Prepared According to this Invention

Figure 2:
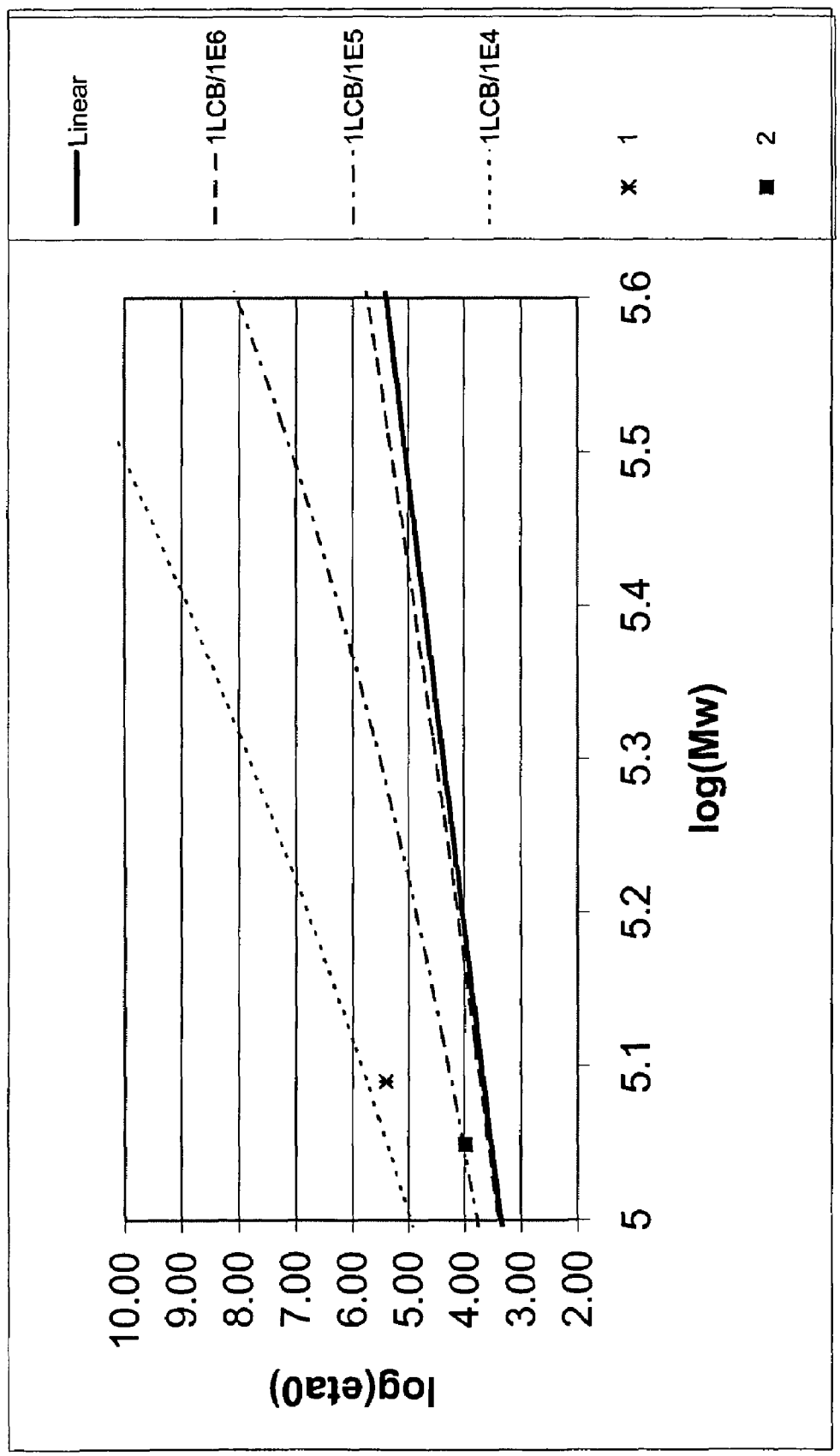
FIG. 2 provides a plot of log $\eta(0)$ versus log($M_w$) for polymers prepared according to the Examples and Table 1.
Figure 3:
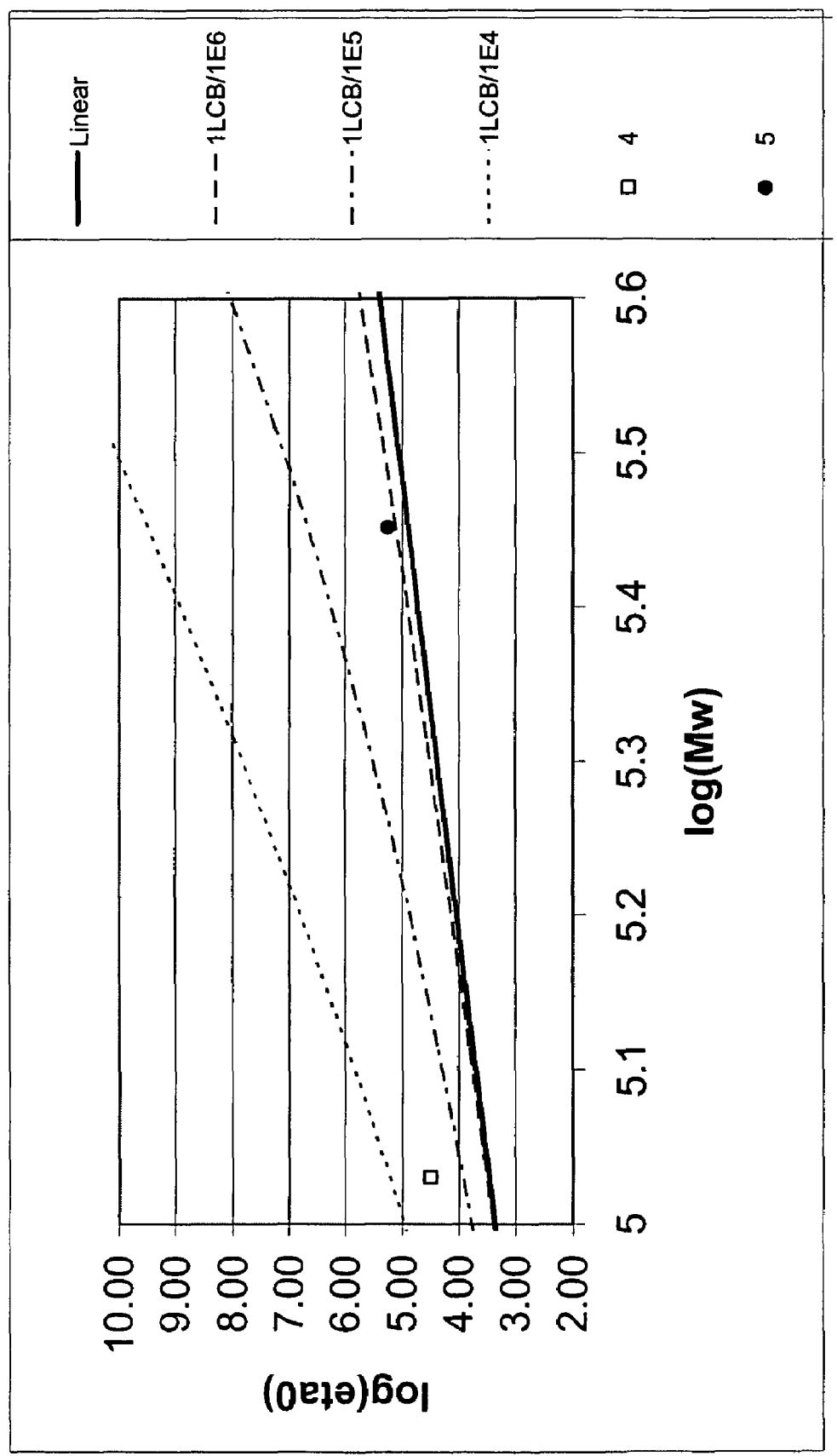
FIG. 3 provides a plot of log $\eta(0)$ versus log($M_w$) for polymers prepared according to the Examples and Table 1.

In one aspect, the ethylene polymer produced using the catalyst composition of this invention may be characterized by lower levels of long chain branching (LCB) than are typically observed when using ansa-metallocene catalysts without a pendant unsaturated moiety attached to the bridge, or when using supports other than the solid oxide activator-supports of this invention. FIGS. 2 and 3 illustrate various aspects of olefin homopolymer produced according to this invention.

Generally, FIGS. 2 and 3 plot $\log(\eta_0)$ versus $\log(M_w)$ for polymers prepared according to the examples and Table 3, and illustrates how reduced LCB levels are manifested. FIG. 2 provides a comparison of the polymers formed using a catalyst comprising an ansa-metallocene with no pendant olefin (compound A) versus a catalyst comprising an ansa-metallocene with a pendant olefin on the bridge between the two cyclopentadienyl-type ligands (compound B). FIG. 3 provides a comparison of the polymers formed using a catalyst comprising an ansa-metallocene with a pendant olefin on the bridge between the two cyclopentadienyl-type ligands (compound B) versus a catalyst comprising an ansa-metallocene with a pendant olefin on a cyclopentadienyl-type ligand, specifically, an indenyl ligand (compound C).

Linear polyethylene polymers are observed to follow a power law relationship between their zero shear viscosity, $\eta_0$, and their weight average molecular weight, $M_w$, with a power very close to 3.4. This relationship is shown by a straight line with a slope of 3.4 when the logarithm of $\eta_0$ is plotted versus the logarithm of $M_w$. Deviations from this linear polymer line are generally accepted as being caused by the presence of long-chain branching (LCB). Janzen and Colby presented a model that predicts the expected deviation from the linear plot of $\log(\eta_0)$ vs. $\log(M_w)$ for given frequencies of LCB as a function of the weight average molecular weight of the polymer. See: ["Diagnosing long-chain branching in polyethylenes," *J. Mol. Struct.* 485-486, 569-584 (1999)], which is incorporated herein by reference, in its entirety.

FIGS. 2 and 3 shows lines for the expected behavior for linear polymers and for the expected increases in zero shear viscosity for the frequencies of 1 $LCB/10^6$ carbons, 1 $LCB/10^5$ carbons, and 1 $LCB/10^4$ carbons as a function of $M_w$. The points correspond to the zero shear viscosities as obtained from fits of the melt viscosity data to the Carreau-Yasuda equation as a function of $M_w$ obtained from size-exclusion chromatography measurements for the polymers prepared according to this invention and to their comparative examples. The reduction in the amount of deviation of the zero shear viscosities from the linear polymer line for the polymers according to this invention compared to their comparative examples indicates the lower levels of LCB for these polymers. Thus, Examples 1 and 4 exhibit the highest level of LCB of those shown in FIGS. 2 and 3, with inventive Example 5 exhibiting the lowest level of LCB as compared to the other examples.

Definitions

In order to more clearly define the terms used herein, the following definitions are provided. To the extent that any definition or usage provided by any document incorporated herein by reference conflicts with the definition or usage provided herein, the definition or usage provided herein controls.

The term "polymer" is used herein to mean homopolymers comprising ethylene and/or copolymers of ethylene and another olefinic comonomer. "Polymer" is also used herein to mean homopolymers and copolymers of any other polymerizable monomer disclosed herein.

The term "cocatalyst" is generally used herein to refer to the organoaluminum compounds that may constitute one component of the catalyst composition, but also refers to the optional components of the catalyst composition including, but not limited to, aluminoxanes, organoboron compounds, or ionizing ionic compounds, as disclosed herein. In one aspect, cocatalysts may be organoaluminum compounds of the formula $Al(X^5)_n(X^6)_{3-n}$, wherein ($X^5$) is a hydrocarbyl having from 1 to about 20 carbon atoms; ($X^6$) is alkoxide or aryloxide, any of which having from 1 to about 20 carbon atoms, halide, or hydride; and n is a number from 1 to 3, inclusive. The term cocatalyst may be used regardless of the actual function of the compound or any chemical mechanism by which the compound may operate.

The term "precontacted" mixture is used herein to describe a first mixture of catalyst components that are contacted for a first period of time prior to the first mixture being used to form a "postcontacted" or second mixture of catalyst components that are contacted for a second period of time. Typically, the precontacted mixture describes a mixture of metallocene, olefin monomer, and organoaluminum compound, before this mixture is contacted with the acidic activator-support and optionally an organoaluminum compound. Thus, "precontacted" describes components that are used to contact each other, but prior to contacting the components in the second, postcontacted mixture. Accordingly, this invention may occasionally distinguish between a component used to prepare the precontacted mixture and that component after the mixture has been prepared. For example, according to this description, it is possible for the precontacted organoaluminum compound, once it is contacted with the metallocene and the olefin monomer, to have reacted to form at least one different chemical compound, formulation, or structure from the distinct organoaluminum compound used to prepare the precontacted mixture. In this case, the precontacted organoaluminum compound or component is described as comprising an organoaluminum compound that was used to prepare the precontacted mixture.

Similarly, the term "postcontacted" mixture is used herein to describe a second mixture of catalyst components that are contacted for a second period of time, and one constituent of which is the "precontacted" or first mixture of catalyst components that were contacted for a first period of time. Typically, the term "postcontacted" mixture is used herein to describe the mixture of metallocene, olefin monomer, organoaluminum compound, and acidic activator-support, formed from contacting the precontacted mixture of a portion of these components with the any additional components added to make up the postcontacted mixture. Generally, the additional component added to make up the postcontacted mixture is the solid oxide activator, and optionally may include an organoaluminum compound the same or different from the organoaluminum compound used to prepare the precontacted mixture, as described herein. Accordingly, this invention may also occasionally distinguish between a component used to prepare the postcontacted mixture and that component after the mixture has been prepared.

The term ansa-metallocene tightly-bridged metallocene describes a metallocene compound in which the two $\eta^5$-cycloalkadienyl-type ligands in the molecule are linked by a bridging moiety, wherein the shortest link of the bridging moiety comprises one atom. Thus, the length of the bridge or the chain between the two cyclopentadienyl-type ligands is a single atom, although this bridging atom is substituted. Thus, the metallocenes of this invention are bridged bis($\eta^5$-cycloalkadienyl)-type compounds, wherein the $\eta^5$-cycloalkadienyl portions include cyclopentadienyl ligands, indenyl ligands, fluorenyl ligands, and the like, including substituted derivatives or analogs of any of these. Possible substituents on these ligands include hydrogen, therefore the description "substituted derivatives thereof" in this invention comprises partially saturated ligands such as tetrahydroindenyl, tetrahydrofluorenyl, octahydrofluorenyl, partially saturated indenyl, partially saturated fluorenyl, substituted partially saturated indenyl, substituted partially saturated fluorenyl, and the like. In some contexts, the metallocene is referred to simply as the "catalyst", in much the same way the term "cocatalyst" is used herein to refer to the organoaluminum compound.

The terms "catalyst composition," "catalyst mixture," and the like do not depend upon the actual product of the reaction of the components of the mixtures, the nature of the active catalytic site, or the fate of the aluminum cocatalyst, ansa-metallocene, any olefin monomer used to prepare a precontacted mixture, or the solid oxide activator after combining these components. Therefore, the terms catalyst composition, catalyst mixture, and the like include both heterogeneous compositions and homogenous compositions.

The term "hydrocarbyl" is used to specify a hydrocarbon radical group that includes, but is not limited to aryl, alkyl, cycloalkyl, alkenyl, cycloalkenyl, cycloalkadienyl, alkynyl, aralkyl, aralkenyl, aralkynyl, and the like, and includes all substituted, unsubstituted, branched, linear, heteroatom substituted derivatives thereof.

The terms solid oxide activator-support, acidic activator-support, activator-support, treated solid oxide compound, or simply "activator," and the like are used herein to indicate a treated, solid, inorganic oxide of relatively high porosity, which exhibits Lewis acidic or Brønsted acidic behavior, and which has been treated with an electron-withdrawing component, typically an anion, and which is calcined. The electron-withdrawing component is typically an electron-withdrawing anion source compound. Thus, the treated solid oxide compound comprises the calcined contact product of at least one solid oxide compound with at least one electron-withdrawing anion source compound. Typically, the activator-support or "treated solid oxide compound" comprises at least one ionizing, acidic solid oxide compound. The terms support or activator-support are not used to imply these components are inert, and this component should not be construed as an inert component of the catalyst composition.

The term "clay" is used herein to refer to that component of the catalyst composition, a substantial portion of which constitutes a clay mineral or a mixture of clay minerals that have been pretreated by either exchanging cations, pillaring or simply wetting, that may be used as a activator-support in the catalyst composition described herein. The transition metal compound and organometal cocatalyst are reacted with the clay activator-support to form the active catalyst. While not intending to be bound by the following statement, the clay component of the catalyst composition of this invention probably functions as a activator-support for the transition metal compound, as well as a cocatalyst from the standpoint that it is in intimate physical chemical contact with the transition metal component.

As used herein, the collective term "clay mineral" is used herein to describe the large group of finely-crystalline, sheet like clay minerals that are found in nature in fine-grained sediments, sedimentary rocks, and the like. Clay minerals are a class of hydrous silicate and aluminosilicate minerals with sheet-like structures and very high surface areas. This term is also used to describe hydrous magnesium silicates with a phyllosilicate structure. Many common clay minerals belong to the kaolinite, montmorillonite, or illite groups of clays. Thus, the term "clay mineral" is not used herein to refer to the fine-grained soil consisting of mineral particles, not necessarily clay minerals, that are less than about 0.002 mm in size.

The term "pillared clay" is used herein to refer to a component of the catalyst composition comprising clay minerals, typically of the of the smectite group and other phylosilicates in addition to sepiolites and palygorskites, that have been ion exchanged with large, typically polynuclear, highly charged metal complex cations. Examples of such ions include, but are not limited to, Keggin ions which may have charges such as 7+, various polyoxometallates, and other large ions. Thus, the term pillaring refers to a simple exchange reaction in which the exchangeable cations of a clay material are replaced with large, highly charged ions, such as Keggin ions. These polymeric cations are then immobilized within the interlayers of the clay and when calcined are coverted to metal oxide "pillars," effectively supporting the clay layers as column-like structures. Examples of pillaring and pillared clays are found in: T. J. Pinnavaia, Science 220 (4595), 365-371 (1983); J. M. Thomas, Intercalation Chemistry, (S. Whittington and A. Jacobson, eds.) Ch. 3, pp. 55-99, Academic Press, Inc., (1972); U.S. Pat. No. 4,452,910; U.S. Pat. No. 5,376,611; and U.S. Pat. No. 4,060,480; each of which is incorporated herein in its entirety.

Although any methods, devices, and materials similar or equivalent to those described herein can be used in the practice or testing of the invention, the typical methods, devices and materials are herein described.

All publications and patents mentioned herein are incorporated herein by reference for the purpose of describing and disclosing, for example, the constructs and methodologies that are described in the publications, which might be used in connection with the presently described invention. The publications discussed above and throughout the text are provided solely for their disclosure prior to the filing date of the present application. Nothing herein is to be construed as an admission that the inventors are not entitled to antedate such disclosure by virtue of prior invention.

For any particular compound disclosed herein, any general structure presented also encompasses all conformational isomers, regioisomers, and stereoisomers that may arise from a particular set of substitutents. The general structure also encompasses all enantiomers, diastereomers, and other optical isomers whether in enantiomeric or racemic forms, as well as mixtures of stereoisomers, as the context requires.

The present invention is further illustrated by the following examples, which are not to be construed in any way as imposing limitations upon the scope thereof. On the contrary, it is to be clearly understood that resort may be had to various other aspects, embodiments, modifications, and equivalents thereof which, after reading the description herein, may suggest themselves to one of ordinary skill in the art without departing from the spirit of the present invention or the scope of the appended claims.

In the following examples, unless otherwise specified, the syntheses and preparations described herein were carried out under an inert atmosphere such as nitrogen and/or argon. Solvents were purchased from commercial sources and were typically dried over activated alumina prior to use. Unless otherwise specified, reagents were obtained from commercial sources.

EXAMPLES

General Testing Procedures

Melt index (MI, g/10 min) was determined in accordance with ASTM D1238 condition F at 190° C. with a 2,160 gram weight.

High load melt index (HLMI, g/10 min) was determined in accordance with ASTM D1238 condition E at 190° C. with a 21,600 gram weight.

Polymer density was determined in grams per cubic centimeter (g/cc) on a compression molded sample, cooled at about 15° C. per hour, and conditioned for about 40 hours at room temperature in accordance with ASTM D1505 and ASTM D1928, procedure C.

Molecular weight and molecular weight distributions were obtained using a PL-GPC 220 (Polymer Labs, UK) system equipped with a differential refractive index detector and three 7.5 mm×300 mm 20 um Mixed A-LS columns (Polymer Labs) running at 145° C. The flow rate of the mobile phase, 1,2,4-trichlorobenzene (TCB) containing 0.5 g/L 2,6-di-t-butyl-4-methylphenol (BHT), was set at 1 mL/min and the concentration of polymer solutions was generally kept in the range of 1.0-1.5 mg/mL, depending on the molecular weights. Sample preparation was conducted at 150° C. for 4 h with occasional and gentle agitation before the solutions being transferred to sample vials for injection. In order to minimize unbalanced solvent peak, solvent with the same composition as the mobile phase was used for solution preparation. The integral calibration method was employed to deduce molecular weights and molecular weight distributions using a Chevron Phillips Chemicals Company's broad linear polyethylene, Marlex BHB5003, as the broad standard. The integral table of the broad standard was pre-determined in a separate experiment with SEC-MALS.

Melt Viscosity Measurements to Determine Shear Viscosity Characteristics

Small-strain oscillatory shear measurements were performed on an ARES oscillatory rheometer using parallel-plate geometry (TA Instruments, formerly Rheometrics Inc.). Data were typically obtained over an angular frequency range of 0.03 to 100 rad/s at a temperature of 190° C.

Fluff samples were stabilized with 0.1 wt % BHT dispersed in acetone and then vacuum dried before molding. Samples were compression molded at 184° C. for a total of three minutes. The samples were allowed to melt at a relatively low pressure for one minute and then subjected to a high molding pressure for an additional two minutes. The molded samples were then quenched in a cold (room temperature) press. 2 mm×25.4 mm diameter disks were stamped out of the molded slabs for rheological characterization.

The test chamber of the rheometer was blanketed in nitrogen in order to minimize polymer degradation. The rheometer was preheated to the initial temperature of the study. Upon sample loading and after oven thermal equilibration, the specimens were squeezed between the plates to a 1.6 mm thickness and the excess was trimmed.

Strains were generally maintained at a single value throughout a frequency sweep but larger strain values were used for low viscosity samples to maintain a measurable torque. Smaller strain values were used for high viscosity samples to avoid overloading the torque transducer and to keep within the linear viscoelastic limits of the sample. The instrument automatically reduces the strain at high frequencies if necessary to keep from overloading the torque transducer.

Viscosity data were fit with a modified Carreau-Yasuda model [R. Byron Bird, Robert C. Armstrong, and Ole Hassager, *Dynamics of Polymeric Liquids, Volume 1, Fluid Mechanics*, (John Wiley & Sons, New York, 1987), p 171-172], which is incorporated by reference herein to obtain estimates of the zero shear viscosity, viscous relaxation time, and a breadth parameter, as indicated below.

$$|\eta^*| = \eta_0/[1+(\omega\tau_\eta)^a]^{((1-n)/a)},$$

wherein:
$|\eta^*|$=magnitude of the complex viscosity in Pa·s
$\omega$=angular frequency in rad/s
$\eta_0$=zero shear viscosity in Pa·s
$\tau_\eta$=viscous relaxation time in s
a=breadth parameter
n=power law parameter, fixed at 0.1818

Absolute Molecular Weight as Determined by Light Scattering

Molecular weight data were determined using SEC-MALS, which combines the methods of size exclusion chromatography (SEC) with multi-angle light scattering (MALS) detection. A DAWN EOS 18-angle light scattering photometer (Wyatt Technology, Santa Barbara, Calif.) was attached to a PL-210 SEC system (Polymer Labs, UK) or a Waters 150 CV Plus system (Milford, Mass.) through a hot transfer line, thermally controlled at the same temperature as the SEC columns and its differential refractive index (DRI) detector (145° C.). At a flow rate setting of 0.7 mL/min, the mobile phase, 1,2,4-trichlorobenzene (TCB), was eluted through three, 7.5 mm×300 mm, 20 μm Mixed A-LS columns (Polymer Labs). Polyethylene (PE) solutions with concentrations of ~1.2 mg/mL, depending on samples, were prepared at 150° C. for 4 h before being transferred to the SEC injection vials sitting in a carousel heated at 145° C. For polymers of higher molecular weight, longer heating times were necessary in order to obtain true homogeneous solutions. In addition to acquiring a concentration chromatogram, seventeen light-scattering chromatograms at different angles were also acquired for each injection using Wyatt's Astra® software. At each chromatographic slice, both the absolute molecular weight (M) and root mean square (RMS) radius, also known as radius of gyration ($R_g$) were obtained from a Debye plot's intercept and slope, respectively. Methods for this process are detailed in Wyatt, P. J., *Anal. Chim. Acta*, 272, 1 (1993), which is hereby incorporated herein by reference in its entirety. The linear PE control employed was a linear, high-density broad MWD polyethylene sample (Chevron Phillips Chemical Co.). The weight average molecular weight ($M_w$), number average molecular weight ($M_n$), z-average molecular weight ($M_z$) and molecular weight distribution ($M_w/M_n$) were computed from this data, and are presented in various Tables.

The Zimm-Stockmayer approach was used to determine the amount of LCB in ethylene polymers. Since SEC-MALS measures M and $R_g$ at each slice of a chromatogram simultaneously, the branching indices, $g_M$, as a function of M could be determined at each slice directly by determining the ratio of the mean square $R_g$ of branched molecules to that of linear ones, at the same M, as shown in equation 1:

$$g_M = \frac{\langle R_g \rangle^2_{br}}{\langle R_g \rangle^2_{lin}} \quad (1)$$

where the subscripts br and lin represent branched and linear polymers, respectively.

At a given $g_M$, the weight-averaged number of LCB per molecule ($B_{3w}$) was computed using Zimm-Stockmayer's equation, shown in equation 2, where the branches were assumed to be trifunctional, or Y-shaped.

$$g_M = \frac{6}{B_{3w}}\left\{\frac{1}{2}\left(\frac{2+B_{3w}}{B_{3w}}\right)^{1/2}\ln\left[\frac{(2+B_{3w})^{1/2}+(B_{3w})^{1/2}}{(2+B_{3w})^{1/2}-(B_{3w})^{1/2}}\right]-1\right\} \quad (2)$$

LCB frequency ($LCB_{Mi}$), the number of LCB per 1000 C, of the $i^{th}$ slice was then computed straightforwardly using equation 3:

$$LCB_{Mi}=1000*14*B_{3w}/M_i \quad (3)$$

where $M_i$ is the MW of the $i^{th}$ slice. The LCB distribution across the molecular weight distribution (LCBD). was thus be established for a full polymer.

A "Quantachrome Autosorb-6 Nitrogen Pore Size Distribution Instrument" was used to determined specific surface area ("surface area") and specific pore volume ("pore volume"). This instrument was acquired from the Quantachrome Corporation, Syosset, N.Y.

Preparation of a Fluorided Silica-Alumina Activator-Support

The silica-alumina used to prepare the fluorided silica-alumina acidic activator-support in this Example was typically Davison silica-alumina obtained from W.R. Grace as Grade MS13-110, containing 13% alumina, having a pore volume of about 1.2 cc/g and a surface area of about 400 m²/g. This material was fluorided by impregnation to incipient wetness with a solution containing ammonium bifluoride in an amount sufficient to equal 10 wt % of the weight of the silica-alumina. This impregnated material was then dried in a vacuum oven for 8 hours at 100° C. The thus-fluorided silica-alumina samples were then calcined as follows. About 10 grams of the alumina were placed in a 1.75-inch quartz tube fitted with a sintered quartz disk at the bottom. While the silica was supported on the disk, dry air was blown up through the disk at the linear rate of about 1.6 to 1.8 standard cubic feet per hour. An electric furnace around the quartz tube was used to increase the temperature of the tube at the rate of about 400° C. per hour to a final temperature of about 500° C. At this temperature, the silica-alumina was allowed to fluidize for about three hours in the dry air. Afterward, the silica-alumina was collected and stored under dry nitrogen, and was used without exposure to the atmosphere.

Metallocene Preparations

All manipulations involving air-sensitive reagents and materials were performed under nitrogen by using standard Schlenk line or dry box techniques. The solvent THF was distilled from potassium, while anhydrous diethyl ether, methylene chloride, pentane, and toluene (Fisher Scientific Company) were stored over activated alumina. All solvents were degassed and stored under nitrogen. Zirconium(IV) chloride (99.5%) and n-butyllithium were purchased from Aldrich Chemical Company and were used as received. Products were analyzed by $^1$H NMR (300 MHz, CDCl$_3$, referenced against residual CHCl$_3$ peak at 7.24 ppm) or $^{13}$C NMR (75 MHz, CDCl$_3$, referenced against central line of CDCl$_3$ at 77.00 ppm).

1-($\eta^5$-3-(2-Propenyldimethylsilyl)indenyl)-1-($\eta^5$-9-fluorenyl)-1-phenylethane zirconium dichloride (IV)

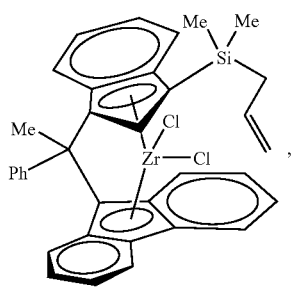

was prepared according to the procedure detailed in Alt, H. G.; Jung, M.; Kehr, G. *J. Organomet. Chem.* 1998, 562, 153-181, which is incorporated herein by reference in its entirety.

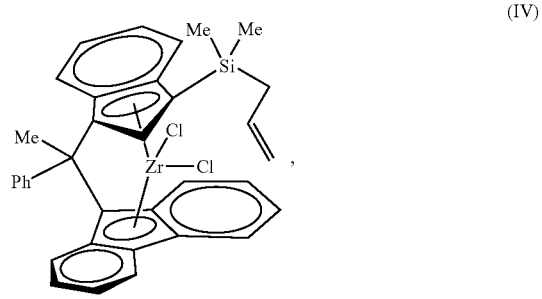

Compounds analogous to IV could be prepared according to a method analogous to that disclosed for IV in Alt, H. G.; Jung, M.; Kehr, G. *J. Organomet. Chem.* 1998, 562, 153-181, using starting compounds that will be readily understood by one of ordinary skill. The following ansa-metallocene compounds could prepared in this manner, and used in the same manner as IV is used to provide polymers with low levels of LCB:

1-($\eta^5$-3-(2-Propenyldimethylsilyl)indenyl)-1-($\eta^5$-2,7-di-t-butyl-9-fluorenyl)-1-phenylethane zirconium dichloride;

1-($\eta^5$-3-(2-Propenyldimethylsilyl)indenyl)-1-($\eta^5$-9-fluorenyl)-1-methylethane zirconium dichloride; and 1-($\eta^5$-3-(2-Propenyldimethylsilyl)indenyl)-1-($\eta^5$-2,7-di-t-butyl-9-fluorenyl)-1-methylethane zirconium dichloride.

Examples 1-5

Comparative Catalytic Runs Varying the Metallocene, Activator-Support, and Pendent Alkene of the Metallocene Examples 1-5 in Table 1 illustrate ethylene polymerization runs performed in a one-gallon autoclave reactor at 100° C., with two liters of isobutane diluent and triisobutylaluminum or triethylaluminum cocatalyst. No hydrogen or comonomer was added. Ethylene was fed on demand to maintain the specified pressure for the specified length of the polymerization run (Table 1). Ansa-Metallocene solutions were usually prepared by dissolving 20-25 mg of metallocene in a mixture of 0-5 mL of 1-hexene, 0-5 mL of 1 M TIBA (Aldrich) or TEA (AKZO), and 15-25 mL of heptane.

In cases where no precontacting was used, or precontacting was carried out in the reactor, the reactor was typically charged with TEA or TIBA, an aliquot of the metallocene solution, and the solid oxide. All materials were added through a charge port while venting isobutane. One method of charging catalyst to the reactor was to charge TEA or TIBA, solid-oxide, and an aliquot of the metallocene solution through a charge port while venting isobutane.

After the allotted polymerization time, the ethylene flow was stopped, and the reactor slowly depressurized and opened to recover a granular polymer. In all cases, the reactor was clean with no indication of any wall scale, coating or other forms of fouling. The polymer was then removed and weighed. Activity was specified as grams of polymer produced per gram of solid oxide compound charged per hour ((g/g)/hr).

The polymerization reaction was carried out in a 1-gallon autoclave as follows. The appropriate solutions, including any stock precontacted solutions, were charged to the autoclave. The autoclave was sealed, and 2 liters of isobutane were added along with any 1-hexene used. Stirring was initiated and maintained at about 700 rpm as the reactor was heated to the reactor run temperature over a period of about 5 minutes. The total pressure was brought to the desired reactor run pressure with ethylene, and ethylene was fed to the reactor on demand to maintain the desired pressure. After the polymerization run time, the stirrer and heating were then stopped and the reactor was rapidly depressurized. The autoclave was then opened and the solid polyethylene was physically removed.

Consistent with the Carreau-Yasuda a parameters in (Table 1) and a plot of log zero shear viscosity vs. log weight average molecular weight (FIGS. 2 and 3), comparative Example 1, containing no tethered olefinic moiety in the metallocene structure, contains more LCB than comparative Examples 2-4, which also contain more LCB than inventive Example 5.

TABLE 1

Polymerization data for polymerizations performed in autoclave reactor.

| A | B | C | D | E | F | G | H | I | J | K | L | M | N | O | P | Q |
|---|---|---|---|---|---|---|---|---|---|---|---|---|---|---|---|---|
| Tether on bridge | | | | | | | | | | | | | | | | |
| 1 (comparative) | A | 0.5 | TEA | 200 | 550 | 90 | 30 | 40 | 229 | 123 | 30 | 4.1 | 5.09 | 2.51E+05 | 5.40 | 0.0134 |
| 2 (comparative) | B | 0.5 | TEA | 200 | 550 | 90 | 30 | 40 | 380 | 112 | 33 | 3.4 | 5.05 | 9.57E+03 | 3.98 | 0.337 |
| 3 (comparative) | B | 1 | TEA | 200 | 450 | 100 | 60 | 0 | 99 | 150 | 51 | 2.9 | 5.18 | 2.43E+04 | 4.39 | 0.257 |
| Tether on $\eta^5$-ligand | | | | | | | | | | | | | | | | |
| 4 (comparative) | B | 1 | TIBA | 200 | 450 | 80 | 30 | 50 | 410 | 107 | 40 | 2.7 | 5.03 | 3.17E+04 | 4.5 | 0.273 |
| 5 (inventive) | C | 1 | TIBA | 200 | 450 | 80 | 30 | 50 | 165 | 283 | 91 | 3.1 | 5.45 | 1.78E+05 | 5.25 | 0.381 |

A. Example number and type.
B. Type of ansa-metallocene used as shown in FIG. 1.
C. Weight of metallocene charged to reactor (mg).
D. Type of organoaluminum cocatalyst used; TEA = triethylaluminum; 1 mL of 15 wt % triethylaluminum (TEA) in heptane used in each case.
E. Activator-support charge (mg); type of solid-oxide used was fluorided Davison silica-alumina (F-SA) calcined at 500° C.
F. Reactor run pressure (psig).
G. Reactor run temp (° C.).
H. Reactor run time (minutes).
I. 1-Hexene charged to reactor after isobutene (grams).
J. Polymer yield (grams).
K. Mw/1000.
L. Mn/1000.
M. Mw/Mn, polydispersity index.
N. Log (Mw).
O. $\eta(0)$; standard exponential notation, for example, 2.51E+05 = 2.51 × 10$^5$.
P. log ($\eta(0)$).
Q. Carreau-Yasuda a parameter

We claim:

1. A catalyst composition comprising:
(i) a precontacted mixture comprising at least one ansa-metallocene, at least one organoaluminum compound, and at least one olefin, and
(ii) at least one activator-support, wherein:
a) the ansa-metallocene comprises a compound having the formula:

$(X^1)(X^2)(X^3)(X^4)M^1$, wherein $M^1$ is titanium, zirconium, or hafnium;
$(X^1)$ and $(X^2)$ are independently selected from a cyclopentadienyl, an indenyl, a fluorenyl, or a substituted analog thereof, wherein at least one of $(X^1)$ and $(X^2)$ is substituted;
at least one substituent of the substituted $(X^1)$ or $(X^2)$ comprises an unsaturated group having the formula —SiR$^4_2$R$^5$, wherein each R$^4$ is independently selected from a hydrocarbyl group or a substituted hydrocarbyl group having from 1 to about 20 carbon atoms;
R$^5$ is selected from an alkenyl group, an alkynyl group, an alkadienyl group, or a substituted analog thereof having from 1 to about 20 carbon atoms;
$(X^1)$ and $(X^2)$ are connected by a substituted or unsubstituted bridging group comprising one atom bonded to both $(X^1)$ and $(X^2)$ selected from carbon, silicon, germanium, or tin; and
any substituent on R$^4$, any substituent on R$^5$, any substituent on the substituted bridging group, any additional substituent on $(X^1)$ or $(X^2)$, and $(X^3)$ and $(X^4)$ are independently selected from an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, —SO$_2$X, —OAlX$_2$, —OSiX$_3$, —OPX$_2$, —SX, —OSO$_2$X, —AsX$_2$, —As(O)X$_2$, —PX$_2$, wherein X is a monoanionic group such as halide, hydride, amide, alkoxide, alkyl thiolate or a substituted derivative thereof, any of which having from 1 to about 20 carbon atoms; a halide; or hydrogen;

b) the organoaluminum compound comprises a compound with the formula:

Al(X$^5$)$_n$(X$^6$)$_{3-n}$, wherein (X$^5$) is a hydrocarbyl having from 1 to about 20 carbon atoms; (X$^6$) is an alkoxide or an aryloxide having from 1 to about 20 carbon atoms, halide, or hydride; and n is a number from 1 to 3, inclusive;

c) the olefin comprises at least one carbon-carbon double bond and from 2 to about 30 carbon atoms; and d) the activator-support comprises:
a solid oxide treated with an electron-withdrawing anion;

a layered mineral,
an ion-exchangeable activator-support, or
any combination thereof.

2. The catalyst composition of claim 1, wherein the solid oxide is silica, alumina, silica-alumina, aluminophosphate, aluminum phosphate, zinc aluminate, heteropolytungstates, titania, zirconia, magnesia, boria, zinc oxide, mixed oxides thereof, or mixtures thereof.

3. The catalyst composition of claim 1, wherein the electron-withdrawing anion is fluoride, chloride, bromide, iodide, phosphate, triflate, bisulfate, sulfate, fluoroborate, fluorosulfate, trifluoroacetate, phosphate, fluorophosphate, fluorozirconate, fluorosilicate, fluorotitanate, permanganate, substituted sulfonate, unsubstituted sulfonate, or any combination thereof.

4. The catalyst composition of claim 1, wherein the activator-support further comprises a metal or metal ion selected from zinc, nickel, vanadium, tungsten, molybdenum, silver, tin, copper, and gallium, or any combination thereof.

5. The catalyst composition of claim 1, wherein the activator-support comprises a clay mineral, a pillared clay, an exfoliated clay, an exfoliated clay gelled into another oxide matrix, a layered silicate mineral, a non-layered silicate mineral, a layered aluminosilicate mineral, a non-layered aluminosilicate mineral, or any combination thereof.

6. The catalyst composition of claim 1, wherein:
the ansa-metallocene has the general formula

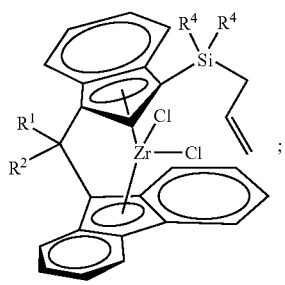
(III)

wherein $R^1$ and $R^2$ are independently selected from methyl or phenyl; and each $R^4$ is independently selected from methyl, ethyl, propyl, or butyl;
the organoaluminum compound is triisobutylaluminum or triethylaluminum;
the olefin is ethylene or 1-hexene; and
the activator-support comprises alumina which has been treated with sulfate ion, chloride ion, or fluoride ion; silica-alumina which has been treated with fluoride ion, or any combination thereof.

7. The catalyst composition of claim 1, wherein the activator-support is bromided alumina, chlorided alumina, fluorided alumina, sulfated alumina, bromided silica-alumina, chlorided silica-alumina, fluorided silica-alumina, sulfated silica-alumina; bromided silica-zirconia, chlorided silica-zirconia, fluorided silica-zirconia, sulfated silica-zirconia, chlorided zinc-alumina, triflate treated silica-alumina, phosphated alumina, fluorided aluminophosphate, or any combination thereof.

8. The catalyst composition of claim 1, wherein $R^5$ is 2-propenyl ($CH_2CH=CH_2$), 3-butenyl ($CH_2CH_2CH=CH_2$), 4-pentenyl ($CH_2CH_2CH_2CH=CH_2$), 5-hexenyl ($CH_2CH_2CH_2CH_2CH=CH_2$), 6-heptenyl ($CH_2CH_2CH_2CH_2CH_2CH=CH_2$), 7-octenyl ($CH_2CH_2CH_2CH_2CH_2CH_2CH=CH_2$), 3-methyl-3-butenyl ($CH_2CH_2C(CH_3)=CH_2$), 4-methyl-3-pentenyl ($CH_2CH_2CH=C(CH_3)_2$), or a substituted analog thereof.

9. The catalyst composition of claim 1, wherein the ansa-metallocene is:
1-($\eta^5$-3-(2-propenyldimethylsilyl)indenyl)-1-($\eta^5$-9-fluorenyl)-1-phenylethane zirconium dichloride;
1-($\eta^5$-3-(2-propenyldimethylsilyl)indenyl)-1-($\eta^5$-2,7-di-t-butyl-9-fluorenyl)-1-phenylethane zirconium dichloride;
1-($\eta^5$-3-(2-propenyldimethylsilyl)indenyl)-1-($\eta^5$-9-fluorenyl)-1-methylethane zirconium dichloride;
1-($\eta^5$-3-(2-propenyldimethylsilyl)indenyl)-1-($\eta^5$-2,7-di-t-butyl-9-fluorenyl)-1-methylethane zirconium dichloride;
or any combination thereof.

10. The catalyst composition of claim 1, wherein ($X^5$) is methyl, ethyl, isopropyl, n-propyl, n-butyl, sec-butyl, isobutyl, 1-hexyl, 2-hexyl, 3-hexyl, isohexyl, heptyl, or octyl.

11. The catalyst composition of claim 1, wherein ($X^6$) is fluoride, chloride, bromide, methoxide, ethoxide, or hydride.

12. The catalyst composition of claim 1, wherein the organoaluminum compound is trimethylaluminum, triethylaluminum, tripropylaluminum, tributylaluminum, triisobutylaluminum, trihexylaluminum, triisohexylaluminum, trioctylaluminum, diethylaluminum ethoxide, diisobutylaluminum hydride, diethylaluminum chloride, or any combination thereof.

13. The catalyst composition of claim 1, wherein the olefin is 1-hexene.

14. The catalyst composition of claim 1, wherein the molar ratio of the olefin to the ansa-metallocene compound is from about 1:10 to about 100,000:1.

15. A process to produce a catalyst composition, comprising:
contacting an ansa-metallocene, an olefin, and an organoaluminum compound for a first period of time to form a precontacted mixture; and
contacting the precontacted mixture with an activator-support and optionally additional organoaluminum compound for a second period of time to form a postcontacted mixture; wherein the ansa-metallocene comprises a compound with the formula:

$(X^1)(X^2)(X^3)(X^4)M^1$, wherein $M^1$ is titanium, zirconium, or hafnium;
($X^1$) and ($X^2$) are independently selected from a cyclopentadienyl, an indenyl, a fluorenyl, or a substituted analog thereof, wherein at least one of ($X^1$) and ($X^2$) is substituted;
at least one substituent of the substituted ($X^1$) or ($X^2$) comprises an unsaturated group having the formula —$SiR^4{}_2R^5$, wherein each $R^4$ is independently selected from a hydrocarbyl group or a substituted hydrocarbyl group having from 1 to about 20 carbon atoms;
$R^5$ is an alkenyl group, an alkynyl group, an alkadienyl group, or a substituted analog thereof having from 1 to about 20 carbon atoms;
($X^1$) and ($X^2$) are connected by a substituted or unsubstituted bridging group comprising one atom bonded to both ($X^1$) and ($X^2$), wherein the atom is carbon, silicon, germanium, or tin; and any substituent on $R^4$, any substituent on $R^5$, any substituent on the substituted bridging group, any additional substituent on $(X^1)$ or $(X^2)$, and $(X^3)$ and $(X^4)$ are independently selected from an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, —$SO_2X$, —$OAlX_2$, —$OSiX_3$, —$OPX_2$, —$SX$, —$OSO_2X$, —$AsX_2$, —$As(O)X_2$, —$PX_2$, wherein X is a monoanionic group such as halide, hydride, amide, alkoxide, alkyl thiolate, or a substituted derivative thereof, any of which having from 1 to about 20 carbon atoms; a halide; or hydrogen.

16. The process of claim 15, wherein the ansa-metallocene, the olefin, and the organoaluminum compound are contacted in the precontacted mixture for a first period of time from about 1 minute to about 24 hours.

17. The process of claim 15, wherein the precontacted mixture, the activator-support, and the optional additional organoaluminum compound are contacted in the postcontacted mixture for a second period of time from about 1 minute to about 24 hours.

18. A method of polymerizing olefins, comprising:
 (i) contacting an ansa-metallocene, an olefin, and an organoaluminum compound in any order for a first period of time to form a precontacted mixture comprising a precontacted ansa-metallocene, a precontacted organoaluminum compound, and a precontacted olefin;
 (ii) contacting the precontacted mixture with an activator-support and optionally additional organoaluminum compound for a second period of time to form a postcontacted mixture comprising a postcontacted ansa-metallocene, a postcontacted organoaluminum compound, a postcontacted olefin, and a postcontacted activator-support; and
 (iii) contacting ethylene and an optional α-olefin comonomer with the postcontacted mixture of step (ii) under polymerization conditions to form a polymer or copolymer;

wherein the ansa-metallocene, prior to contacting, comprises a compound having the formula:

$(X^1)(X^2)(X^3)(X^4)M^1$, wherein $M^1$ is titanium, zirconium, or hafnium;

$(X^1)$ and $(X^2)$ are independently selected from a cyclopentadienyl, an indenyl, a fluorenyl, or a substituted analog thereof, wherein at least one of $(X^1)$ and $(X^2)$ is substituted;

at least one substituent of the substituted $(X^1)$ or $(X^2)$ comprises an unsaturated group having the formula —$SiR^4{}_2R^5$, wherein each $R^4$ is independently selected from a hydrocarbyl group or a substituted hydrocarbyl group having from 1 to about 20 carbon atoms;

$R^5$ is an alkenyl group, an alkynyl group, an alkadienyl group, or a substituted analog thereof having from 1 to about 20 carbon atoms;

$(X^1)$ and $(X^2)$ are connected by a substituted or unsubstituted bridging group comprising one atom bonded to both $(X^1)$ and $(X^2)$, wherein the atom is carbon, silicon, germanium, or tin; and any substituent on $R^4$, any substituent on $R^5$, any substituent on the substituted bridging group, any additional substituent on $(X^1)$ or $(X^2)$, and $(X^3)$ and $(X^4)$ are independently selected from an aliphatic group, an aromatic group, a cyclic group, a combination of aliphatic and cyclic groups, an oxygen group, a sulfur group, a nitrogen group, a phosphorus group, an arsenic group, a carbon group, a silicon group, a germanium group, a tin group, a lead group, a boron group, an aluminum group, —$SO_2X$, —$OAlX_2$, —$OSiX_3$, —$OPX_2$, —$SX$, —$OSO_2X$, —$AsX_2$, —$As(O)X_2$, —$PX_2$, wherein X is a monoanionic group such as halide, hydride, amide, alkoxide, alkyl thiolate, or a substituted derivative thereof, any of which having from 1 to about 20 carbon atoms; a halide; or hydrogen.

* * * * *